US012561102B2

(12) United States Patent　Satoh

(10) Patent No.:　US 12,561,102 B2
(45) Date of Patent:　Feb. 24, 2026

(54) INFORMATION PROCESSING APPARATUS, PRINTING SYSTEM, PRINTING METHOD, AND STORAGE MEDIUM

(71) Applicant: Kohichi Satoh, Chiba (JP)

(72) Inventor: Kohichi Satoh, Chiba (JP)

(73) Assignee: Ricoh Company, Ltd., Tokyo (JP)

( * ) Notice:　Subject to any disclaimer, the term of this patent is extended or adjusted under 35 U.S.C. 154(b) by 0 days.

(21) Appl. No.: 18/517,533

(22) Filed:　Nov. 22, 2023

(65)　　　Prior Publication Data

US 2024/0176559 A1　May 30, 2024

(30)　　Foreign Application Priority Data

Nov. 28, 2022　(JP) ................................. 2022-189521

(51) Int. Cl.
　　*G06F 3/12*　　　(2006.01)
(52) U.S. Cl.
　　CPC ............ *G06F 3/121* (2013.01); *G06F 3/1234* (2013.01)
(58) Field of Classification Search
　　CPC ............................... G06F 3/121; G06F 3/1234
　　See application file for complete search history.

(56)　　　References Cited

U.S. PATENT DOCUMENTS

2007/0024655 A1 * 2/2007 Masashi ................. B41J 29/393
　　　　　　　　　　　　　　　　　　　347/14
2014/0160526 A1 * 6/2014 Shinagawa ........... G06F 3/1296
　　　　　　　　　　　　　　　　　　　358/1.15

2016/0080609 A1　3/2016　Inada
2017/0064096 A1　3/2017　Shimura
2021/0014367 A1 * 1/2021　Nakayama ......... H04N 1/00344
2021/0365220 A1 * 11/2021　Higashiuchi .......... G06F 3/1256
2023/0161521 A1 * 5/2023　Morales ................ G06F 3/1282
　　　　　　　　　　　　　　　　　　　358/1.15

FOREIGN PATENT DOCUMENTS

| JP | 11-085541 A | 3/1999 |
| JP | 2003-330648 | 11/2003 |
| JP | 2007-050651 | 3/2007 |
| JP | 2016-062194 | 4/2016 |
| JP | 2017-049424 | 3/2017 |

OTHER PUBLICATIONS

NPL : 2007-2024.*
NPL: Results Publication Date Range: Jul. 1, 1998 to Jul. 11, 2025.*
Japanese Office Action for 2022-189521 mailed on May 28, 2024.
Japanese Office Action for 2025-075530 mailed on Nov. 4, 2025.

* cited by examiner

*Primary Examiner* — Quang N Vo
(74) *Attorney, Agent, or Firm* — IPUSA, PLLC

(57)　　　　ABSTRACT

An information processing apparatus includes processing circuitry. The processing circuitry receives an execution instruction for executing a print job in which a print medium is designated or detected. The processing circuitry acquires environmental information indicating a surrounding environment of a printing device. The processing circuitry acquires environmental condition information indicating an environmental condition related to the print medium that is designated or detected. The processing circuitry transmits the print job to the printing device based on the environmental information satisfying the environmental condition.

20 Claims, 18 Drawing Sheets

PRINTING SYSTEM 1

PRINT SERVER 20

USER TERMINAL 30

N1

COMMUNICATION NETWORK

ENVIRONMENT
MEASURING DEVICE 40

PRINTING DEVICE 10

FACILITY
DEVICE 50

FIG. 9

| SHEET CODE | SHEET NAME | APPROPRIATE TEMPERATURE RANGE [°C] | APPROPRIATE HUMIDITY RANGE [%] | USABLE TEMPERATURE RANGE [°C] | USABLE HUMIDITY RANGE [%] |
|---|---|---|---|---|---|
| Y001 | SHEET A | 16~20 | 51~55 | 12.8~16 | 40.8~44 |
| Y002 | SHEET B | 21~25 | 56~60 | 16.8~20 | 44.8~48 |
| Y003 | SHEET C | 26~30 | 61~65 | 20.8~24 | 48.8~52 |
| ... | ... | ... | ... | ... | ... |

FIG. 10

| JOB CODE | JOB NAME | SHEET CODE | END TIME |
|----------|----------|------------|----------|
| J001 | JOB A | Y001 | 6:00 |
| J002 | JOB B | Y002 | 4:00 |
| J003 | JOB C | Y003 | 8:00 |
| ... | ... | ... | ... |

INFORMATION PROCESSING APPARATUS, PRINTING SYSTEM, PRINTING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-189521, filed on Nov. 28, 2022, in the Japan Patent Office, the entire disclosure of which is hereby incorporated by reference herein.

BACKGROUND

Technical Field

Embodiments of the present disclosure relate to an information processing apparatus, a printing system, a printing method, and a storage medium.

Related Art

For example, in a printing factory, a large and high-speed printing apparatus is used to perform a large amount of printing. Some printing sheets are affected by a surrounding environment such as temperature or humidity, and when the surrounding environment in which they are used is inappropriate, problems such as sheet jam may occur.

In the printing factory, a printing process is to be finished so as not to cause delay in, for example, predetermined delivery date or the next printing process.

For this reason, an operator such as an employee in the printing factory may execute a large amount of printing process requiring a considerable amount of time for printing, for example, by using the time during which the operator is absent, such as idle time and break time, as well as the time outside the working hours, such as night-time and holidays. In this case, the operator sets recording materials such as printing sheets and toner, which are to be used later, into the printing apparatus before the absence time or before the end of working hours and starts printing such that the printing is finished when the operator returns to the printing apparatus or on the next business day.

On the other hand, various media (such as a printing sheet) are used for printing. The printing sheet has characteristics that are affected by the surrounding environment such as the temperature or the humidity, and when the environment in which they are used is inappropriate, problems such as sheet jam may occur.

In the printing factory, for example, an experienced operator adjusts the temperature or humidity such that the temperature or humidity is suitable for the printing sheets to be used based on experience of the experienced operator in order to avoid problems such as sheet jam. When the printing is performed at different times of the day as described above, it is possible to reduce a risk that a scheduled printing process is not finished due to problems such as a sheet jam and a delay in delivery date or the next process. This is the reason why the experienced operator adjusts the temperature or humidity.

The temperature or humidity of an area in which the printing apparatus is installed does not change immediately even if the setting of the temperature or humidity of an air conditioning equipment installed in the area is changed. For this reason, the operator has to wait without giving a print instruction to the printing apparatus until the temperature or humidity becomes suitable for the printing sheets to be used. As a result, the time is not effectively utilized.

As described above, in the printing factory, the printing process tends to depend on the experience of the operator in executing the printing process effectively using different times of the day while avoiding the problems such as the sheet jam in advance. It is expected to promote automation of the printing process so that such the printing process can be executed even by an inexperienced operator.

For example, a printing apparatus that controls printing according to a temperature inside the printing apparatus is disclosed. The printing apparatus checks whether the temperature in the printing apparatus is an appropriate temperature for printing on the special sheet. When the temperature in the printing apparatus is an appropriate temperature for printing on the special sheet, the printing apparatus executes printing on the special sheet. When the temperature in the printing apparatus is not an appropriate temperature for printing on the special sheet, the printing apparatus stops printing on the special sheet.

SUMMARY

Embodiments of the present disclosure described herein provide a novel information processing apparatus including processing circuitry. The processing circuitry receives an execution instruction for executing a print job in which a print medium is designated or detected. The processing circuitry acquires environmental information indicating a surrounding environment of a printing device. The processing circuitry acquires environmental condition information indicating an environmental condition related to the print medium that is designated or detected. The processing circuitry transmits the print job to the printing device based on the environmental information satisfying the environmental condition.

Embodiments of the present disclosure described herein provide a novel printing system including a printing device, an information processing terminal, and an information processing apparatus. The information processing apparatus is communicably connected with the information processing terminal and the printing device through a network. The information processing terminal includes first processing circuitry to transmit an execution instruction for executing a print job in which a print medium is designated or detected to the information processing apparatus. The information processing apparatus includes second processing circuitry. The second processing circuitry receives the execution instruction from the information processing terminal. The second processing circuitry acquires environmental information indicating a surrounding environment of a printing device. The second processing circuitry acquires environmental condition information indicating an environmental condition related to the print medium that is designated or detected. The second processing circuitry transmits the print job to the printing device based on the environmental information satisfying the environmental condition.

Embodiments of the present disclosure described herein provide a novel information processing method. The method includes: receiving an execution instruction for executing a print job in which a print medium is designated or detected; acquiring environmental information indicating a surrounding environment of a printing device; acquiring environmental condition information indicating an environmental condition related to the print medium that is designated or detected; and transmitting the print job to the printing device based on the environmental information satisfying the environmental condition.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a conceptual diagram of an environmental condition table according to an embodiment of the present disclosure;

FIG. 10 is a conceptual diagram of a job management table according to an embodiment of the present disclosure;

Figure 1:
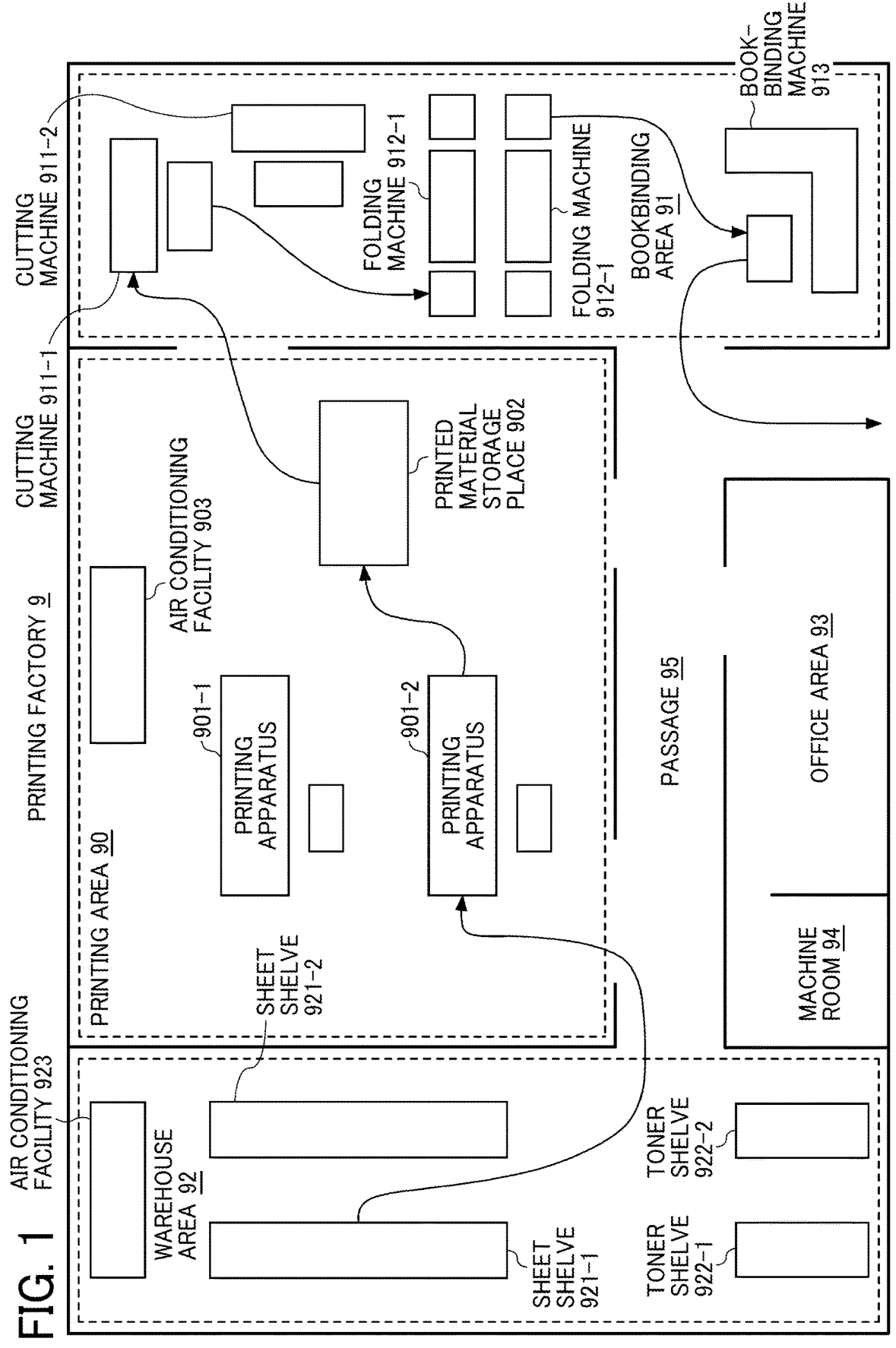
FIG. 1 is a schematic diagram of a printing factory according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail below, with reference to the drawings. In the drawings, like reference numerals denote like elements, and redundant descriptions thereof may be omitted in the following description.

First Embodiment

A printing system according to an embodiment of the present disclosure is used in a facility such as a printing factory or a data center where a large amount of printing is performed.

The printing factory according to the present embodiment executes a printing process and a bookbinding process to produce printed materials such as books and booklets. The printing process prints print data on a large number of printing sheets of several thousands to several tens of thousands. The bookbinding process executes processing such as cutting, folding, and bookbinding on the printed printing sheets. The printing system according to the present embodiment is used for a printing process executed in the printing factory. However, the application of the printing system according to the present embodiment is not limited to the above, and the printing system may be used in any application as long as printing is performed on a large number of printing sheets. For example, the printing system may be used in a printing factory that does not execute processes any other than the printing process such as the bookbinding process described above and executes only the printing process.

FIG. 1 is a schematic diagram of the printing factory according to an embodiment of the present disclosure.

As illustrated in FIG. 1, the printing factory 9 according to the present embodiment is divided into, for example, a printing area 90, a bookbinding area 91, a warehouse area 92, and an office area 93. The office area 93 includes a machine room 94. The printing area 90, the bookbinding area 91, the warehouse area 92, and the office area 93 of the printing factory 9 are arranged to allow traffic to and from each other through a passage 95.

In the printing area 90, multiple printing apparatuses 901-1 and 901-2, a printed material storage place 902, and an air conditioning facility 903 are installed. In the bookbinding area 91, multiple cutting machines 911-1 and 911-2, multiple folding machines 912-1 and 912-2, and a bookbinding machine 913 are installed. In the warehouse area 92, multiple sheet shelves 921-1 and 921-2, multiple toner shelves 922-1 and 922-2, and an air conditioning facility 923 are installed.

The multiple printing apparatuses 901-1 and 901-2, the multiple cutting machines 911-1 and 911-2, the multiple folding machines 912-1 and 912-2, and the multiple sheet shelves 921-1 to 921-2 or the multiple toner shelves 922-1 and 922-2 are collectively referred to as a printing apparatus 901, a cutting machine 911, a folding machine 912, a sheet shelf 921, or a toner shelf 922 respectively in the following description unless otherwise particularly distinguished.

The number of the printing apparatuses 901, the cutting machines 911, the folding machines 912, the bookbinding machines 913, the sheet shelves 921, and the toner shelves 922 is an example, and may be increased or decreased as desired according to, for example, the scale of the printing factory 9 or the printing amount. The types of machines or facilities installed in the printing area 90 and the bookbinding area 91 are examples, and machines used in the printing process or the bookbinding process may be installed as desired. The types of shelves installed in the warehouse area 92 are examples and may be changed in accordance with the types or quantities of equipment desired in the printing factory 9. Each area may be partitioned in any way and may be implemented on one floor or any kind or number of floors without partitioning.

A description is given below of a process of an operation in the printing factory 9. An operator such as an employee of the printing factory 9 confirms that recording materials such as printing sheets and toner desired for a print job are set in the printing apparatus 901 in the printing area 90. When the printing sheets or the toner runs short, the operator takes out a desired number of printing sheets or toner from the sheet shelf 921 or the toner shelf 922 in the warehouse area 92 and sets the printing sheets or the toner in the printing apparatus 901 to be used.

After confirming that the recording materials such as the printing sheets and toner are sufficiently set, the operator operates the printing apparatus 901 to print desired print data on a desired number of printing sheets. The printed sheets ejected from the printing apparatus 901 are temporarily stored in the printed material storage place 902. The description up to this point is of the printing process.

When the printing process is finished, the operator carries the printed printing sheets from the printed material storage place 902 to the bookbinding area 91. The printing sheets carried to the bookbinding area 91 are placed at a workplace of the cutting machine 911. Subsequently, the operator operates the cutting machine 911 to cut the printing sheets.

Subsequently, the operator places the cut printing sheets at a workplace of the folding machine 912 and operates the folding machine 912 to perform folding on the cut printing sheets. Subsequently, the operator places the printing sheet after the folding at a workplace of the bookbinding machine 913 and operates the bookbinding machine 913 to perform bookbinding on the printing sheets. The description up to this point is of the bookbinding process.

An accessory such as a cover, a belly band, or a sales card is attached to the printed materials such as books or booklets as appropriate. Then, the printed materials are packed and shipped from the printing factory 9.

Figure 2:
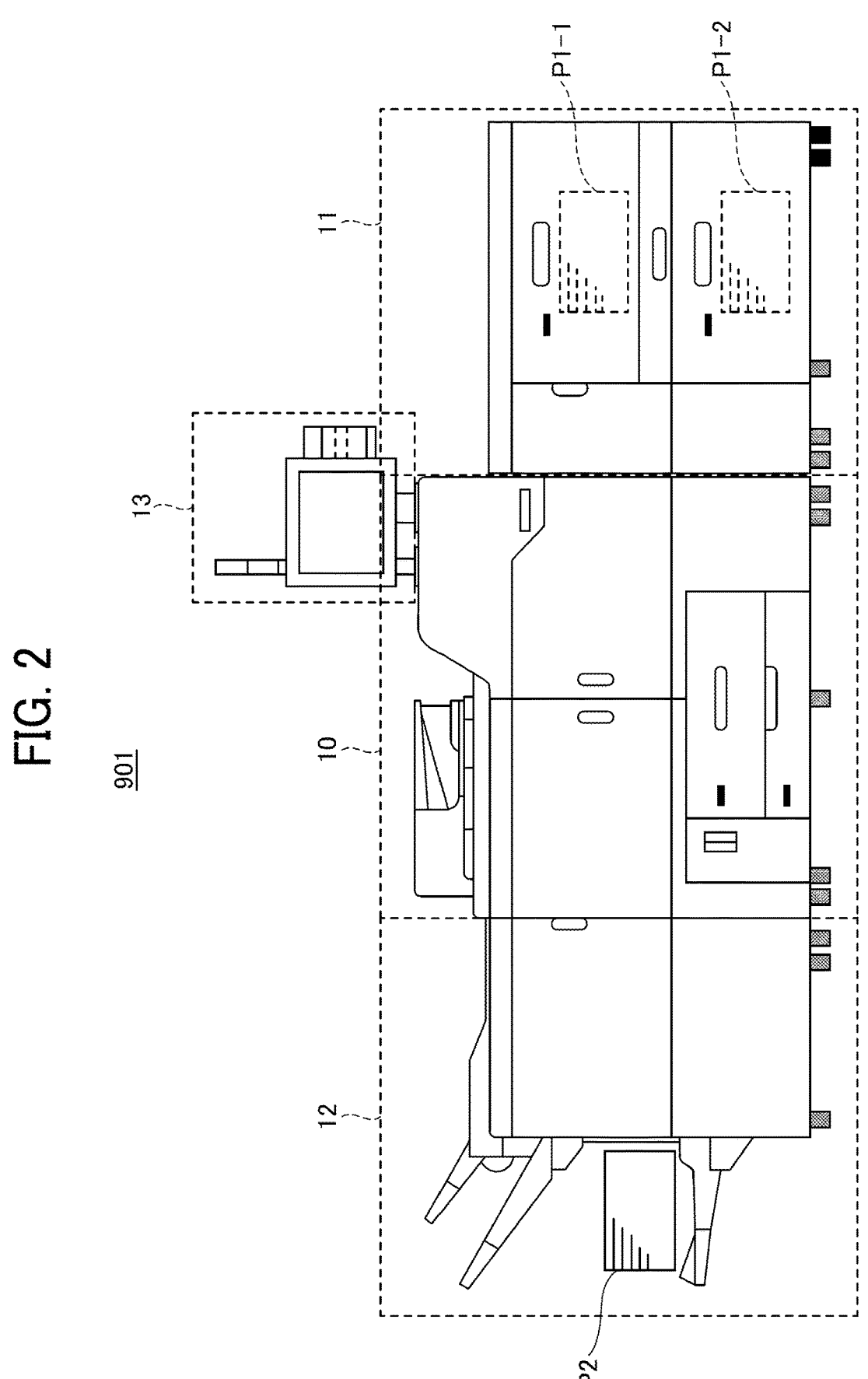
FIG. 2 is an external side view of a printing apparatus according to an embodiment of the present disclosure.

FIG. 2 is an external side view of the printing apparatus according to an embodiment of the present disclosure.

As illustrated in FIG. 2, the printing apparatus 901 according to the present embodiment includes a printing device 10, a sheet feeding device 11, a sheet ejection device 12, and an operation panel 13. In the printing apparatus 901, a device can be added, changed, or deleted depending on the use. For example, the sheet feeding device 11 can be selected in accordance with the type of a printing sheet to be used or the number of sheets to be printed at a time. For example, the sheet ejection device 12 can be selected in accordance with post-processing such as folding, binding, and punching, or the number of sheets to be printed at a time.

Several thousands to several tens of thousands of unprinted printing sheets P1-1 and P1-2 are loaded inside the sheet feeding device 11. The printing sheets P1-1 and P1-2 may be printing sheets of different types such as materials and sizes or may be printing sheets of the same type. The printing device 10 prints print data on the printing sheet loaded in the sheet feeding device 11 in accordance with an instruction from the operator. The printed printing sheet is conveyed to the sheet ejection device 12. A printed printing sheet P2 ejected from the sheet ejection device 12 is stacked on a predetermined sheet ejection tray.

The operator can operate the operation panel 13 to set, for example, the type of printing sheet, the number of printed sheets, and a request of post-processing. The operator can operate the operation panel 13 to perform control such as start or stop of printing. The operator can refer to, for example, a message displayed on the operation panel 13 to grasp the state of the printing apparatus 901.

The operator can select one of the options displayed on the operation panel 13 to designate the type of printing sheet. When the printing apparatus 901 includes a sensor for identifying the type of printing sheet, the type of printing sheet can be displayed on the operation panel 13 by the operator identifying the printing sheet with the sensor. The sheet feeding device 11 may include a sensor for identifying the type of printing sheet such that the type of the set printing sheets P1-1 and P1-2 is identified and displayed on the operation panel 13.

Figure 3:
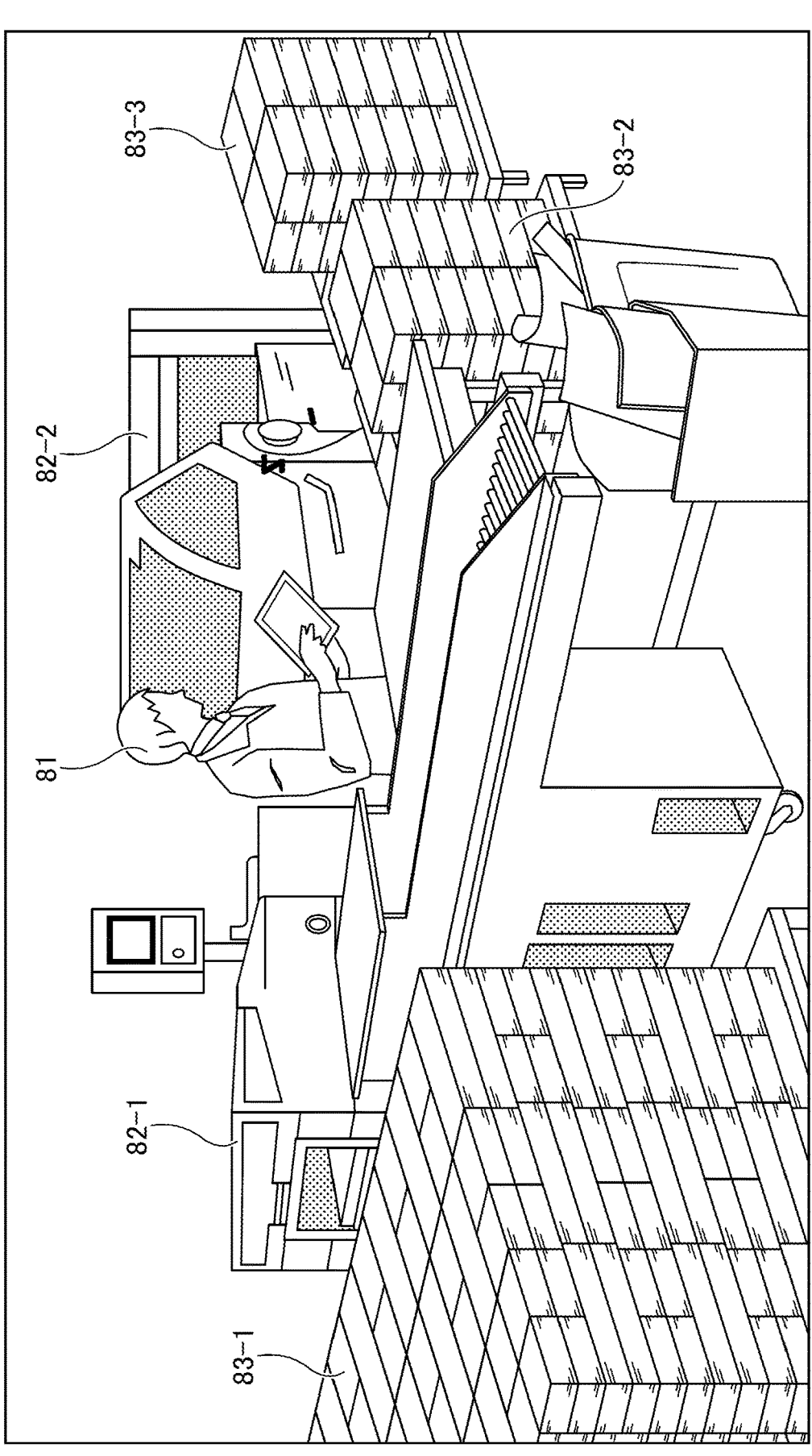
FIG. 3 is a diagram of operations performed in a printing factory according to an embodiment of the present disclosure.

FIG. 3 is a diagram of operations performed in the printing factory according to an embodiment of the present disclosure. As illustrated in FIG. 3, in the printing factory 9, a large number of printing sheets 83-1, 83-2, and 83-3 are arranged around devices 82-1 and 82-2 used in the printing process or the bookbinding process. For example, an operator 81 executes a desired process on the printing sheets 83-1 using the device 82-1 and places the processed printing sheets 83-2 around the device 82-2 that executes the next process.

The printing apparatus 901 can print several thousands to several tens of thousands of sheets at a time as long as specifications of the sheet feeding device 11 and the sheet ejection device 12 allow. When several tens of thousands of sheets are printed at a time, several hours may be taken from the start of printing to the finish of printing. For example, when printing is performed on twenty thousands of printing sheet, it may take two to three hours to finish the printing. Typically, when the operator sets the number of printing sheets and toner desired for printing in the printing apparatus 901 and performs an operation of instructing the start of printing, printing is automatically performed until the printing is finished. For example, in a printing factory that operates for twenty-four hours a day, when a large amount of printing can be performed over a long period of time at night or during non-working hours such as holidays when no operator is present, the productivity of the overall printing factory 9 greatly increases.

On the other hand, since the printing sheet (medium) is effected by the surrounding environment such as an ambient temperature or an ambient humidity (that may simply be referred to as temperature or humidity) of the air directly surrounding the printing sheet or the space in the printing area 90 where the printing device 10 is installed that performs the printing process on the printing sheet (e.g., a room or space where the printing sheets are placed or the printing device 10 is installed), the printing sheet may be unsuitable for printing (e.g., depending on the type of material or surface shape of a medium such as a sheet, the sheet may expand due to moisture absorption and be wavy, or conversely the sheet may contract due to release of moisture and be warped or curled) or overlapping printing sheet may adhere to each other. When the printing apparatus 901 is unsuitable for printing or printing sheets adhere to each other due to the influence of the surrounding environment, problems such as a sheet jam may occur in the printing apparatus 901. The adhesion of the printing sheet depends on the type of material or surface shape.

In the printing factory, the environment in the printing area 90 is adjusted for each type of printing sheet to avoid an occurrence of problem caused by close contact of printing sheet. The environment adjustment may be manually performed by an experienced operator or may be manually performed while an environment suitable for printing is managed in a database for each type of printing sheet and an appropriate environment is checked according to the type of printing sheet to be used.

When printing is performed during hours in which the operator is not present, printing sheets and toner are set during hours in which the operator is present, and the printing is started after adjustment to an environment appropriate for the printing sheets to be used. However, the surrounding environment such as an ambient temperature or an ambient humidity may change during the printing due to the influence of the outside air. When control can be performed such that printing is performed in a case of an appropriate environment and adjustment of the environment is performed in a case of an inappropriate environment in accordance with a change in the environment, the possibility of occurrence of a problem can be reduced even during hours in which the operator is not present.

Figure 4:
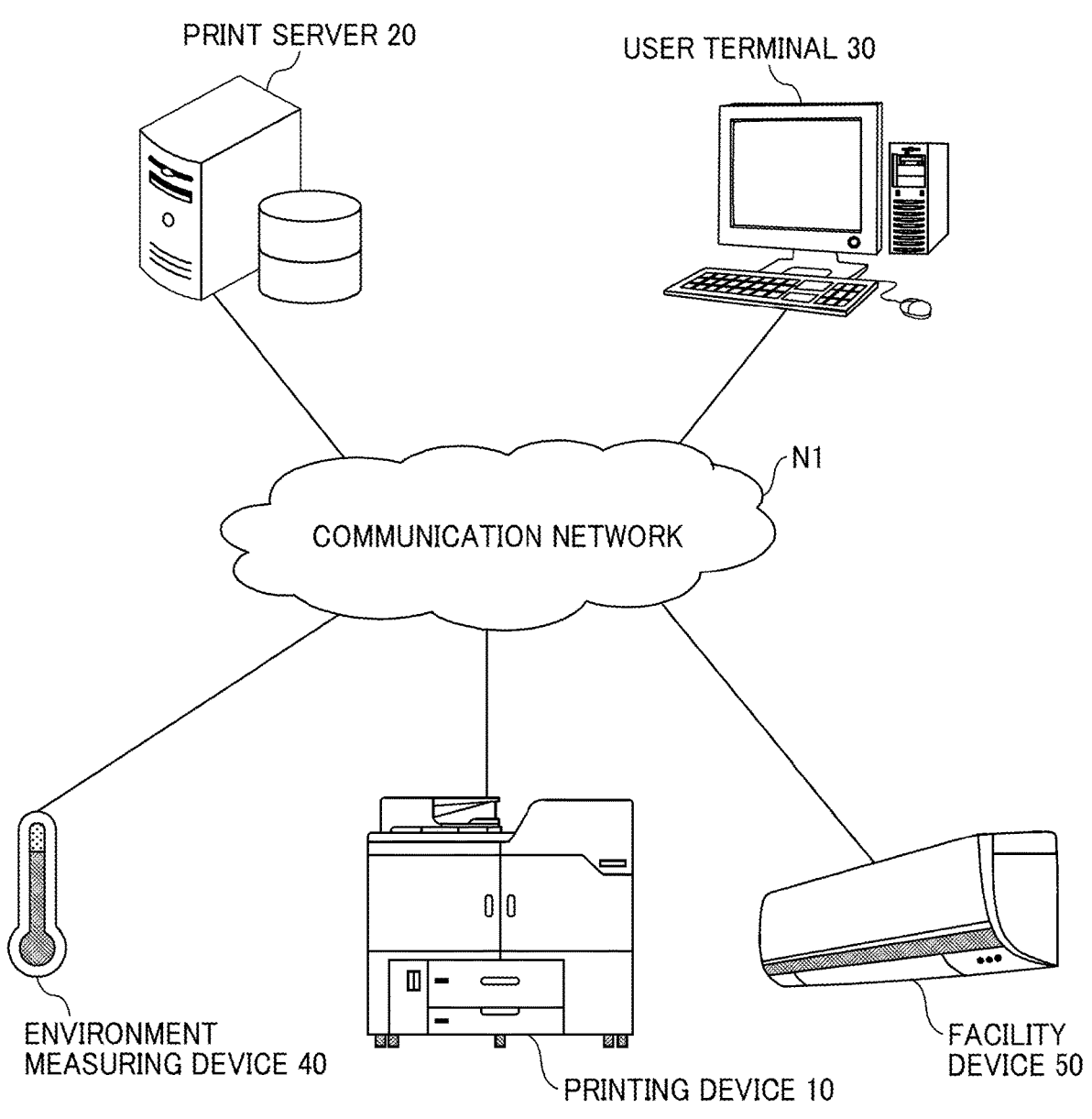
FIG. 4 is a block diagram illustrating an overall configuration of a printing system according to a first embodiment of the present disclosure.

FIG. 4 is a block diagram illustrating an overall configuration of the printing system according to an embodiment of the present disclosure.

As illustrated in FIG. 4, a printing system 1 according to the present embodiment includes the printing device 10, a print server 20, a user terminal 30, an environment measuring device 40, and a facility device 50. Each of the printing device 10, the print server 20, the user terminal 30, the environment measuring device 40, and the facility device 50 is connected to a communication network N1. The communication network N1 allows the devices that are connected to the communication network N1 to communicate with each other.

The communication network N1 is, for example, a wired communication network such as the Internet, a local area network (LAN), or a wide area network (WAN). Alternatively, the communication network N1 may be a wireless communication network such as a wireless local area network (LAN) or a short-range wireless communication network, or a mobile communication network such as worldwide interoperability for microwave access (WiMAX), long term evolution (LTE), or 5th generation (5G) network.

The printing device 10 is an image forming device that prints print data on a printing sheet. In other words, the printing device 10 is the image forming device that prints an image on the printing sheet based on the print data. The printing device according to the present embodiment is an electrostatic recording device that causes toner to adhere to a printing sheet by the action of static electricity. The printing device according to the present embodiment is, for example, a laser printer or an electrostatic copying machine.

The print data is electronic data in which, for example, characters and images to be printed on a printing sheet are laid out.

The printing device 10 prints print data on a printing sheet according to a print job. The print job in the present embodiment includes print data indicating content to be printed, sheet information indicating the type of printing sheet to be printed and print settings such as the number of printing sheets, color, print side (single-sided printing or duplex printing), and print magnification. The print job is input from the operation panel 13 or the print server 20 to the printing device 10 by an operation of the operator. The printing device 10 outputs a message for notifying the operator of, for example, a state during printing to the operation panel 13 or the print server 20.

The print server 20 serves as an information processing apparatus that spools a print job to be printed by the printing device 10 and transmits the print job to the printing device 10 according to a job scheduler. The print server 20 serves as a computer. The print server 20 is installed in, for example, the machine room 94 illustrated in FIG. 1.

The print server 20 receives mode information indicating an operation mode of the printing device 10 from the user terminal 30. The print server 20 receives a print job execution instruction from the user terminal 30 and accumulates the instructed print job in a spool. The print server 20 reads the print job from the spool in accordance with a state of job execution of the printing device 10 and transmits the print job to the printing device 10.

The user terminal 30 serves as an information processing terminal operated by the operator. The user terminal 30 serves as a computer. Alternatively, the user terminal 30 may be a smartphone or a tablet terminal. The user terminal 30 is installed in, for example, the printing area 90, the office area 93, or the machine room 94 illustrated in FIG. 1.

The user terminal 30 transmits the mode information indicating the operation mode of the printing device 10 to the print server 20 in response to an operation of the operator. The user terminal 30 transmits the print job execution instruction to the print server 20 in response to an operation by the operator. The user terminal 30 outputs the message received from the printing device 10 to the operator.

The print server 20 and the user terminal 30 are not limited to the information processing apparatus provided that the print server 20 and the user terminal 30 are devices having a communication function. Examples of the print server 20 and the user terminal 30 include, but are not limited to, output devices such as a projector (PJ), an interactive whiteboard (IWB; an electronic whiteboard that can perform mutual communication and has a blackboard function), and digital signage, a head-up display (HUD), an industrial machine, an imaging device, a sound collecting device, a medical device, a networked home appliance, an automobile (connected car), a laptop personal computer (PC), a mobile phone, a smartphone, a tablet terminal, a game console, a personal digital assistant (PDA), a digital camera, a wearable PC, and a desktop PC.

The environment measuring device 40 is a measuring device that measures the environment of the space in which the printing device 10 is installed. The environment measuring device 40 is installed in, for example, the printing area 90. In particular, the environment measuring device 40 is preferably installed in the area around the printing apparatus 901. For example, the environment measuring device 40 according to the present embodiment has a function of measuring the temperature or humidity of a space. Examples of the environment measuring device 40 according to the present embodiment include a thermometer or a hygrometer.

The facility device 50 is a facility device for adjusting the environment of a space in which the printing device 10 is installed. The facility device 50 is installed in, for example, the printing area 90 illustrated in FIG. 1. The facility device according to the present embodiment has a function of adjusting the temperature and humidity of the space in which the printing device 10 is installed. Examples of the facility device in the present embodiment include an air conditioner, a humidifier, an air cleaner with a humidifying function, and an air conditioner with a humidifying function.

The overall configuration of the printing system 1 described above with reference to FIG. 4 is merely an example, and various system configurations may be employed depending on the use or purposes. For example, the printing system 1 may include one or more of the printing device 10, the print server 20, the user terminal 30, the environment measuring device 40, and the facility device 50. For example, the print server 20 may be implemented by multiple computers or may be implemented as a cloud computing service. FIG. 4 illustrates an example division of devices such as the printing device 10, the print server 20, and the user terminal 30.

Figure 5:
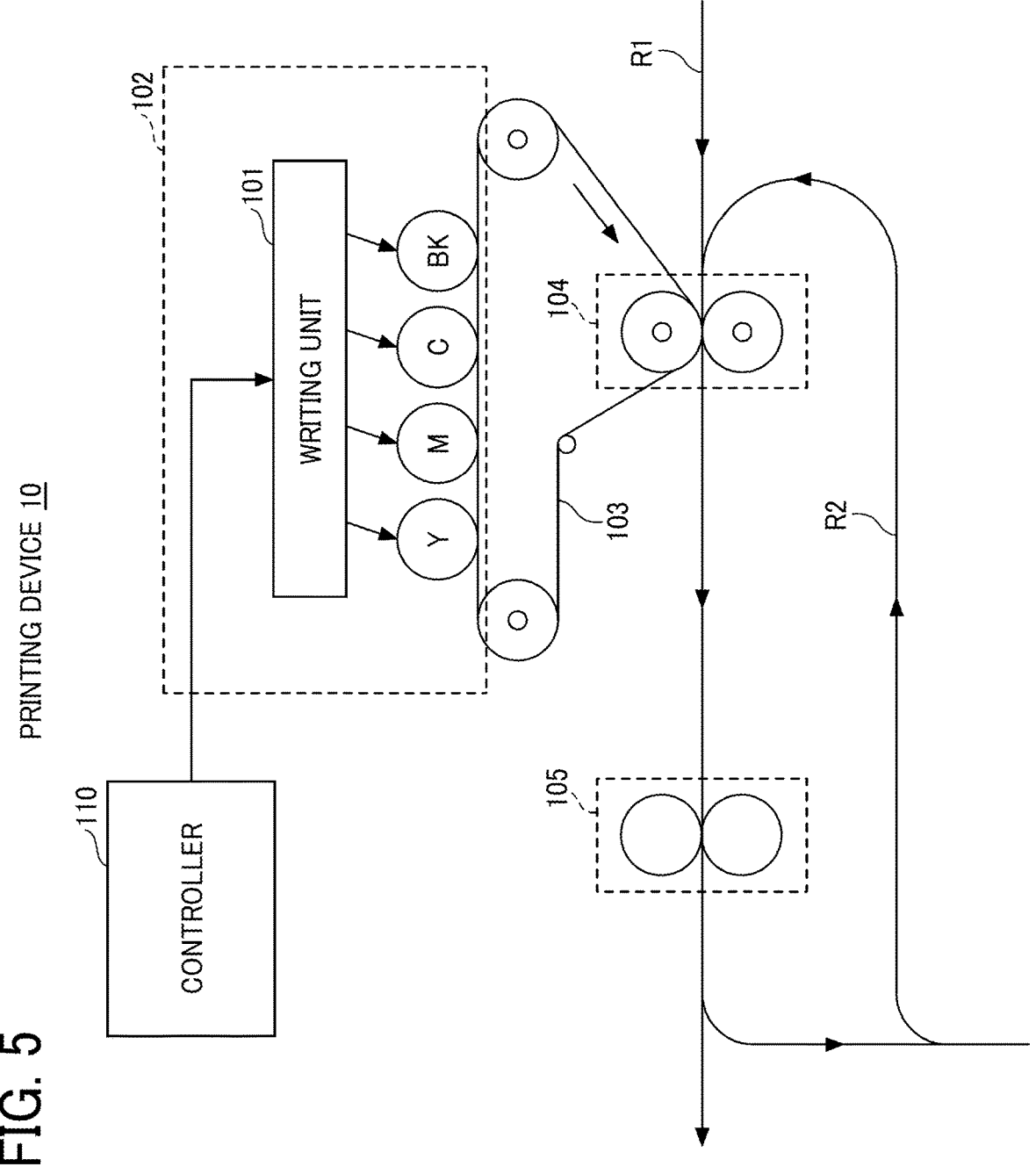
FIG. 5 is a schematic diagram illustrating a hardware configuration of a printing device according to an embodiment of the present disclosure.

FIG. 5 is a schematic diagram illustrating a hardware configuration of the printing device according to an embodiment of the present disclosure.

As illustrated in FIG. 5, the printing device 10 according to the present embodiment includes a writing unit 101, an image forming unit 102, an intermediate transfer belt 103, a secondary transfer unit 104, a fixing unit 105, and a controller 110.

The writing unit 101 emits laser light to form a transfer image (toner image) on the image forming unit 102.

The image forming unit 102 includes a photoconductor, a developer, and toner, and emits laser light from the writing unit 101 to form the toner image. The image forming unit 102 includes photoconductor drums Y (yellow), M (magenta), C (cyan), and BK (black). The image forming unit 102 performs an image forming process, including a charging process, an exposing process, and a developing process, to form a toner image on each of the photoconductor drums Y, M, C, and BK. The toner images formed on the photoconductor drums Y, M, C, and BK are transferred to the intermediate transfer belt 103 in a transfer process. After the transfer process of the toner image, the image forming unit 102 performs a cleaning process to clean the intermediate transfer belt 103 and prepare for the next image forming process.

When a full-color toner image is formed, the image forming unit 102 transfers a yellow toner image to the intermediate transfer belt 103, sequentially transfers a magenta toner image, a cyan toner image, and a black toner image, and superimposes the toner images to the intermediate transfer belt 103 to form the full-color toner image. The image forming unit 102 forms the yellow toner image, the magenta toner image, the cyan toner image, and the black toner image on the photoconductor drums Y, M, C, and BK, respectively.

The transfer process of the toner images from the photoconductor drums Y, M, C, and BK to the intermediate transfer belt 103 is referred to as a primary transfer, and the transfer process from the intermediate transfer belt 103 to a printing sheet is referred to as a secondary transfer. The image forming unit 102 conveys the toner images (full-color toner image) transferred from the photoconductor drums Y, M, C, and BK onto the intermediate transfer belt 103 while being superimposed on top of another to a position (secondary transfer position) of the secondary transfer unit 104. The secondary transfer position is a position where a secondary transfer roller contacts a conveyance path R1 or R2. The conveyance path R1 is a conveyance path for single-sided printing, and the conveyance path R2 is a conveyance path for duplex printing.

The secondary transfer unit 104 collectively transfers (secondary transfer) the full-color toner image transferred to the intermediate transfer belt 103 to a printing sheet at the secondary transfer position.

The fixing unit 105 causes a pair of rollers to apply heat and pressure to the printing sheet bearing the full-color toner image to fix the full-color toner image onto the printing sheet.

The controller 110 controls the overall operation of the printing device 10. In the present embodiment, the controller 110 further converts image data transmitted from a host device into a format (transfer image) in which the writing unit 101 can form an image.

The controller 110 signals to and from the operation panel 13 to grasp the content of operations performed by the operator and notify the operator of various kinds of information. The controller 110 executes a predetermined printing process based on, for example, a print job input from an external device such as the print server 20.

Figure 6:
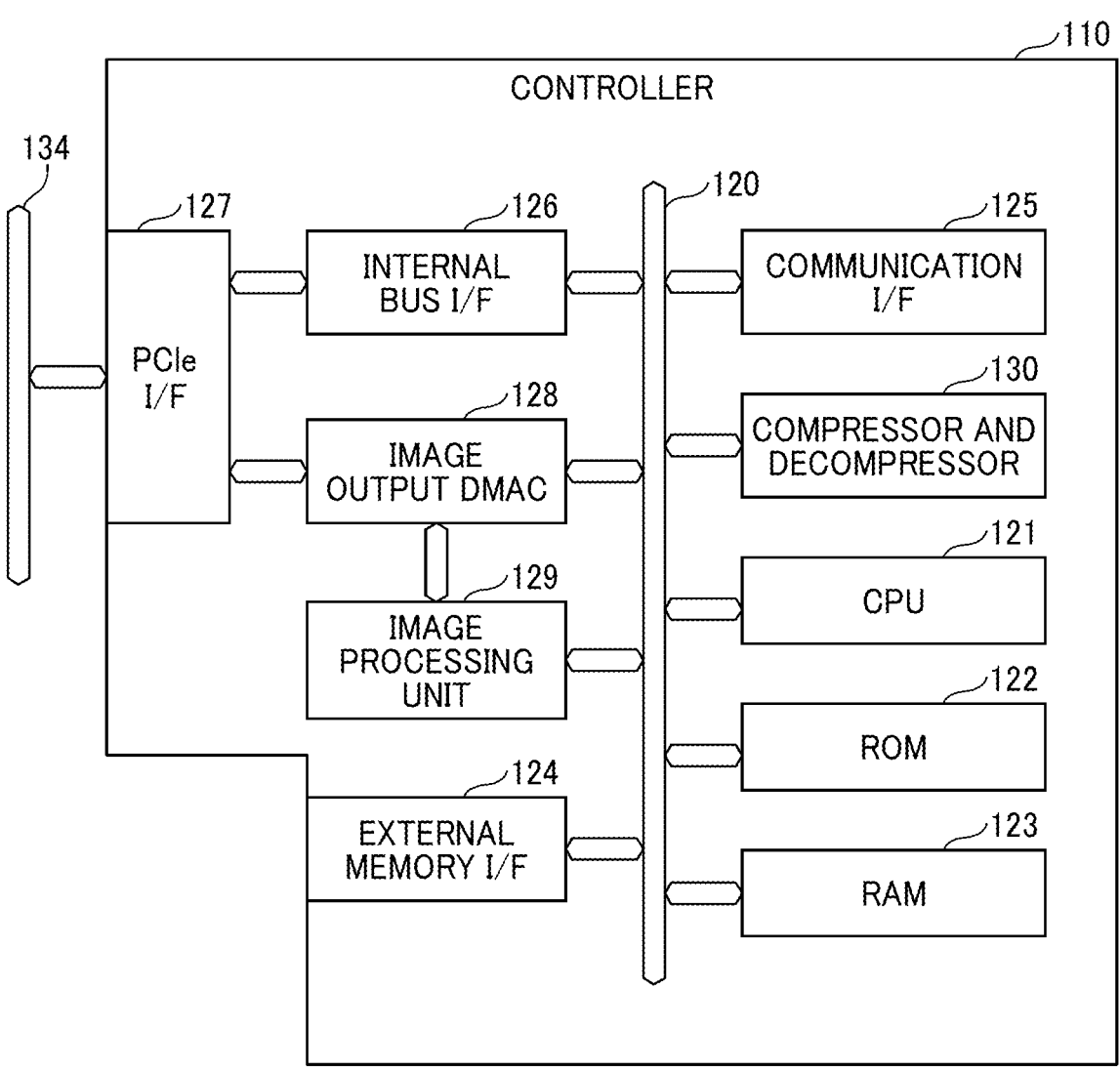
FIG. 6 is a block diagram illustrating a hardware configuration of a controller according to an embodiment of the present disclosure.

Referring to FIGS. 6, a description is given below of a hardware configuration of the controller 110 according to the present embodiment. FIG. 6 is a block diagram illustrating a hardware configuration of the controller 110 according to an embodiment of the present disclosure.

As illustrated in FIG. 6, the controller 110 according to the present embodiment includes a central processing unit (CPU) 121, a read-only memory (ROM) 122, a random access memory (RAM) 123, an external memory interface (I/F) 124, a communication I/F 125, an internal bus I/F 126, a peripheral component interconnect express (PCIe) I/F 127, an image output direct memory access controller (DMAC) 128, an image processing unit 129, and a compressor and decompressor 130. An internal bus 120 connects the above-described units and components.

The internal bus 120 further connects the above-described units and components to a PCIe bus 134 via the internal bus I/F 126 and the PCIe I/F 127.

The CPU 121 executes various types of arithmetic processing to perform all settings related to the operation of the printing system 1 and activates the image output DMAC 128, the image processing unit 129, and the compressor and decompressor 130.

An operation control program that is employed for the CPU 121 is stored in the ROM 122. The RAM 123 is employed not only as a temporary storage location in which calculation results of the CPU 121 and various kinds of data are stored but also as a memory to store images. The ROM 122 and the RAM 123 are collectively referred to as internal memories unless the ROM 122 and the RAM 123 are distinguished from each other.

The external memory I/F 124 connects to an image memory that is used as a memory for storing images. When the CPU 121 receives print data from the print server 20, the CPU 121 draws an image in the image memory via the external memory I/F 124 based on a page description language.

The communication I/F 125 is an interface that connects the print server 20 and the operation panel 13 to the controller 110.

The internal bus I/F 126 is an interface between the PCIe I/F 127 and the internal bus 120. The internal bus I/F 126 inputs and outputs image data between addresses designated by a PCIe bus master and the image memory via the external memory I/F 124.

The PCIe I/F 127 performs data transmission and reception with the PCIe bus master in accordance with a protocol of the PCIe bus 134.

The image output DMAC 128 and the image processing unit 129 are connected to, for example, the CPU 121 and the external memory I/F 124 via the internal bus 120. The image output DMAC 128 is also connected to the PCIe I/F 127.

The image output DMAC 128 functions as a direct memory access controller when printing is performed. When the image output DMAC 128 is activated by the CPU 121, the image output DMAC 128 reads image data from an external memory in a pre-designated area and outputs the read image data to the PCIe I/F 127. The output of image data above described is performed by an exchange of handshake at any time.

The image processing unit 129 corrects distortion of an image that has been read.

The compressor and decompressor 130 is activated by the CPU 121 and performs various data-compression or decompression. The compressor and decompressor 130 is employed to save memory.

Figure 7:
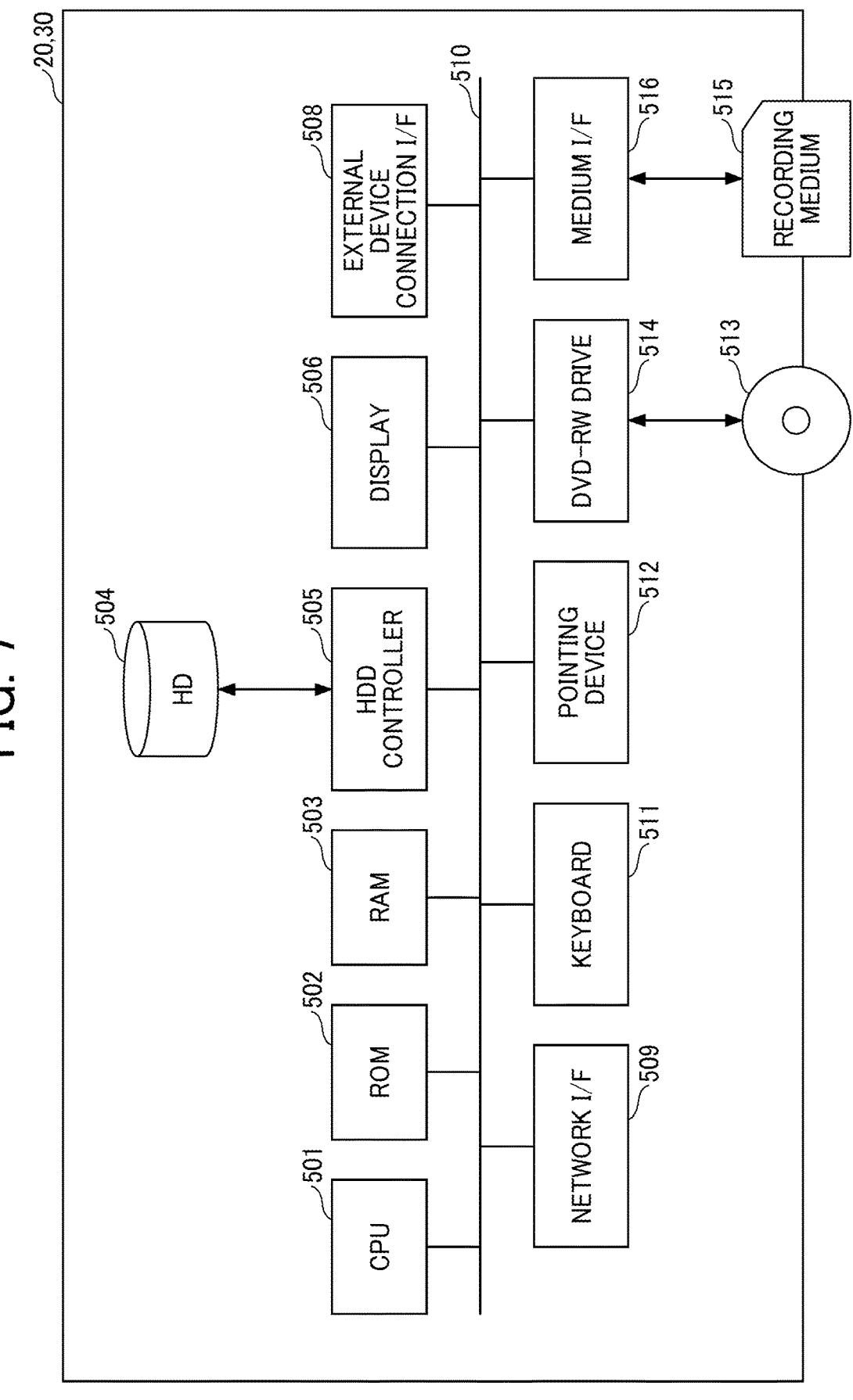
FIG. 7 is a block diagram illustrating a hardware configuration of a computer according to an embodiment of the present disclosure.

The print server 20 and the user terminal 30 according to the present embodiment are implemented by a computer. FIG. 7 is a block diagram illustrating a hardware configuration in a case where the print server 20 or the user terminal 30 is implemented by a computer.

As illustrated in FIG. 7, the computer according to the present embodiment includes a CPU 501, a ROM 502, a RAM 503, a hard disk (HD) 504, an hard disk drive (HDD) controller 505, a display 506, an external device connection I/F 508, a network I/F 509, a bus line 510, a keyboard 511, a pointing device 512, a digital versatile disk rewritable (DVD-RW) drive 514, and a medium I/F 516.

The CPU 501 controls the overall operation of the computer. The ROM 502 stores programs such as an initial program loader (IPL) to boot the CPU 501. The RAM 503 is used as a work area for the CPU 501. The HD 504 stores various data such as programs. The HDD controller 505 controls reading and writing of various kinds of data from and to the HD 504 under control of the CPU 501.

The display 506 displays various kinds of information such as a cursor, a menu, a window, a character, or an image. The external device connection I/F 508 is an interface that connects the computer to various external devices. Examples of the external devices include, but are not limited to, a universal serial bus (USB) memory and a printer. The network I/F 509 is an interface that enables data communication through the communication network N1. The bus line 510 is, for example, an address bus or a data bus that electrically connects the elements illustrated in FIG. 7, such as the CPU 501, to each other.

The keyboard 511 is an input device provided with multiple keys for the operator to input, for example, characters, numerals, or various instructions. The pointing device 512 serves as an input device that allows the operator to, for example, select or execute a specific instruction, select a target for processing, or move a cursor being displayed. The DVD-RW drive 514 controls reading and writing of various kinds of data from and to a DVD-RW 513, which serves as a removable recording medium according to the present embodiment. The removable storage medium is not limited to the DVD-RW and may be, for example, a digital versatile disk-recordable (DVD-R). The medium I/F 516 controls reading or writing (storing) of data from or to a storage medium 515 such as a flash memory.

Figure 8:
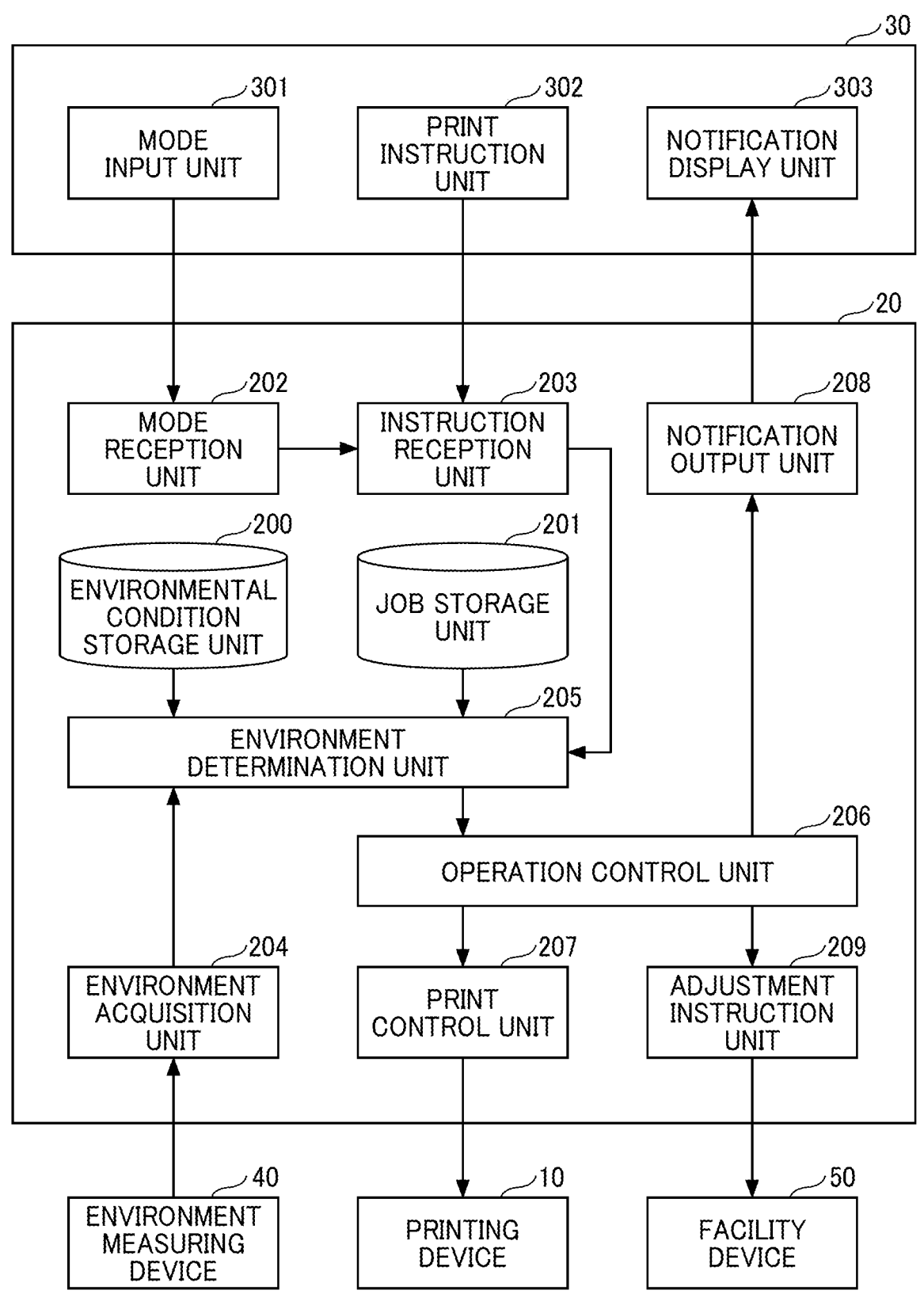
FIG. 8 is a block diagram illustrating a functional configuration of the printing system according to the first embodiment of the present disclosure.

Referring to FIG. 8, a description is given below of a functional configuration of the printing system 1 according to the present embodiment. FIG. 8 is a block diagram illustrating a functional configuration of the printing system 1 according to an embodiment of the present disclosure.

As illustrated in FIG. 8, the print server 20 according to the present embodiment includes an environmental condition storage unit 200, a job storage unit 201, a mode reception unit 202, an instruction reception unit 203, an environment acquisition unit 204, an environment determination unit 205, an operation control unit 206, a print control unit 207, a notification output unit 208, and an adjustment instruction unit 209.

The environmental condition storage unit 200 and the job storage unit 201 are implemented by, for example, the HD 504 illustrated in FIG. 7. Reading or writing of the data stored in the HD 504 is performed via, for example, the HDD controller 505.

The mode reception unit 202, the instruction reception unit 203, the environment acquisition unit 204, the environment determination unit 205, the operation control unit 206, the print control unit 207, the notification output unit 208, and the adjustment instruction unit 209 are implemented by, for example, processing executed by the CPU 501 and the network I/F 509 according to the program loaded from the ROM 502 into the RAM 503 illustrated in FIG. 7.

The environmental condition storage unit 200 stores environmental condition information indicating environmental condition suitable for the use of a printing sheet. The environmental condition information according to the present embodiment is stored in an environmental condition table. The environmental condition table stores environmental condition information for each type of the printing sheet. The environmental condition information according to the present embodiment includes a range of temperature and a range of humidity suitable for use of the printing sheet, and a range of temperature and a range of humidity that the printing sheet can be used.

The job storage unit 201 stores print jobs. The print job according to the present embodiment is stored in a job management table. The print job according to the present embodiment includes the sheet information indicating the type of a printing sheet to be used. The type of the printing sheet may be designated by the operator or may be automatically detected from the printing sheet set in the printing device 10. The print job may include an end time at which the print job is desired to be finished.

The mode reception unit 202 receives mode information indicating an operation mode of the printing device 10 from the user terminal 30 to receive input of the mode information. The mode reception unit 202 sets the operation mode of the printing device 10 to the operation mode indicated by the received mode information.

The operation mode according to the present embodiment includes a normal print mode and a nighttime print mode. The normal print mode is used in a time zone in which the operator is present, for example, during working hours on weekdays. The night print mode is used in a time zone in which the operator is not present, such as night hours, holiday or other non-working hours.

The instruction reception unit 203 receives a signal indicating a print job execution instruction from the user terminal 30 to receive the print job execution instruction. The print job execution instruction includes information indicating a print job to be executed.

The environment acquisition unit 204 acquires environmental information indicating the surrounding environment of the printing device 10. The environmental information according to the present embodiment includes information of an ambient temperature and an ambient humidity detected by the environment measuring device 40.

The environment determination unit 205 acquires environmental condition information from the environmental condition storage unit 200. The environmental condition information is related to the printing sheet designated by the print job whose execution instruction has been received. The environment determination unit 205 determines whether the environmental information acquired by the environment acquisition unit 204 satisfies the acquired environmental condition. The environment determination unit 205 serves as an environmental condition acquisition unit.

The environmental condition storage unit 200 may not be included in the print server 20 and may be included in an external device different from the print server 20. In this case, the environment determination unit 205 acquires the environmental condition information from the environmental condition storage unit 200 included in the external device via the communication network N1. The environment determination unit 205 may acquire the environmental condition information stored in the external device via the communication network N1 and temporarily store (cache) the environmental condition information in the environmental condition storage unit 200.

The operation control unit 206 controls the operation of the printing device 10 based on the mode information received by the mode reception unit 202 and a result of determination by the environment determination unit 205. When the mode information indicates the normal print mode, the operation control unit 206 executes a normal printing process. When the mode information indicates the nighttime print mode, the operation control unit 206 executes a nighttime printing process.

The print control unit 207 transmits a print job to the printing device 10 in accordance with the execution instruction received by the instruction reception unit 203. The print control unit 207 is executed by the operation control unit 206 when the environment determination unit 205 determines that the environmental information satisfies the environmental condition.

The notification output unit 208 transmits a notification message such as a warning indicating that the environment is desired to be adjusted to the user terminal 30. The notification output unit 208 is executed by the operation control unit 206 when the environment determination unit 205 determines that the environmental information does not satisfy the environmental condition in the normal print mode.

The adjustment instruction unit 209 transmits a signal for instructing the facility device 50 to adjust the environment. An adjustment of the environment according to the present embodiment indicates that the temperature and humidity of the space in which the printing device 10 is installed are adjusted such that a temperature range and a humidity range are appropriate for the printing sheet. The adjustment instruction unit 209 is executed by the operation control unit 206 when the nighttime print mode is set, and the environmental information is determined not to satisfy the environmental condition.

FIG. 9 is a conceptual diagram of the environmental condition table according to an embodiment of the present disclosure.

As illustrated in FIG. 9, the environmental condition table according to the present embodiment includes, as data items, identification information (sheet code) for identifying a printing sheet (medium), a name of the printing sheet (sheet name), a temperature range suitable for printing (appropriate temperature range), a humidity range suitable for printing (appropriate humidity range), a printable temperature range (usable temperature range), and a printable humidity range (usable humidity range).

The type of printing sheet (medium) is, for example, plain paper, high-quality paper, coated paper, matte paper, leatherette, thick paper or thin paper (thin), or overhead projector (OHP). The medium is not limited to paper but includes various media. The type of printing sheet (medium) is not limited to a commonly used name, and may be defined based on, for example, a raw material, a quality of material, or smoothness of surface. The smoothness of the surface greatly effects the adhesion between printing sheets.

As the ambient temperature or ambient humidity (the temperature or humidity of the space in the environment) lowers, a malfunction such as a sheet jam is likely to occur. Accordingly, the usable temperature range and the usable humidity range are set to be lower than the appropriate temperature range and the appropriate humidity range. However, the usable temperature range and the usable humidity range may be set to be higher than the appropriate temperature range and the appropriate humidity range in a case where there is a similar tendency as the ambient temperature or the ambient humidity is higher according to characteristics such as a model of the printing device 10, and the usable temperature range and the usable humidity range are not limited thereto. In FIG. 9, the upper limit value and the lower limit value of the usable temperature range are set to 80% of the upper limit value and the lower limit value of the appropriate temperature range. Similarly, the upper limit value and the lower limit value of the usable humidity range are set to 80% of the upper limit value and the lower limit value of the appropriate humidity range.

FIG. 10 is a conceptual diagram of the job management table according to an embodiment of the present disclosure.

As illustrated in FIG. 10, the job management table according to the present embodiment includes, as data items, identification information (job code) for identifying a print job, a name of the print job (job name), identification information (sheet code) for identifying a printing sheet to be used, and a time at which the print job is desired to be finished (end time).

The setting of the end time is optional, and the end time may not be set. The end time may be set to a common time for all print jobs or a different time for each print job separately.

The job management table may include information (e.g., a printer name, or a uniform resource identifier (URI)) with which the printing device 10 that performs printing can be identified. In this case, different end times may be set for the printing devices 10 respectively.

As illustrated in FIG. 8, the user terminal 30 according to the present embodiment includes a mode input unit 301, a print instruction unit 302, and a notification display unit 303.

The mode input unit 301, the print instruction unit 302, and the notification display unit 303 are implemented by, for example, processing executed by the CPU 501 and the network I/F 509 according to the program loaded from the ROM 502 into the RAM 503 illustrated in FIG. 7.

The mode input unit 301 receives mode information in response to an operation by the operator. The mode input unit 301 transmits the received mode information to the print server 20.

The print instruction unit 302 receives an instruction to execute a print job in response to an operation by the operator. The print instruction unit 302 transmits the received instruction to execute the print job to the print server 20.

The notification display unit 303 displays a notification screen for displaying a notification message such as a warning received from the print server 20 on the display 506.

Referring to FIGS. 11 to 16, a description is given below of a procedure for executing a printing method according to the present embodiment.

Figure 11:
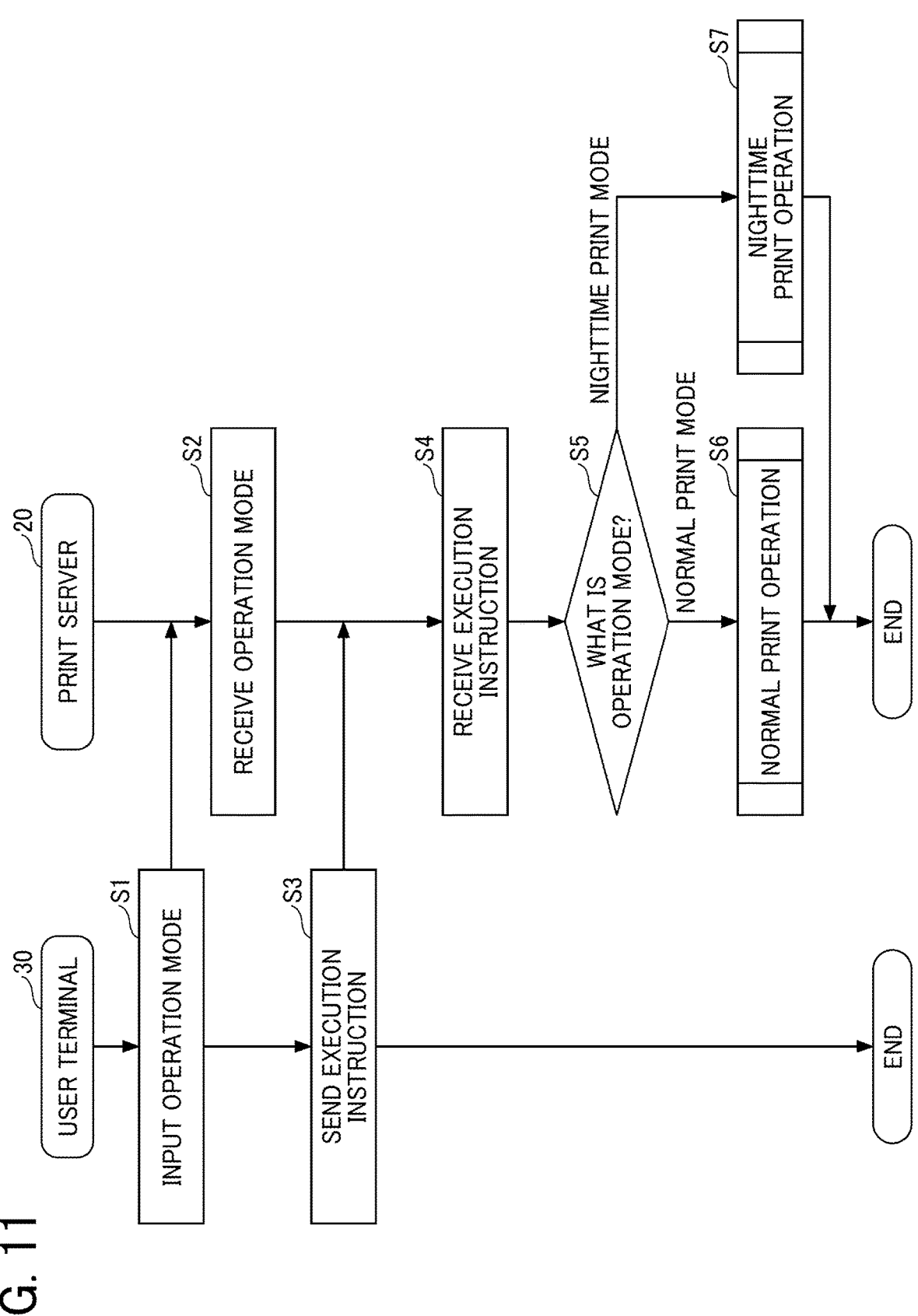
FIG. 11 is a flowchart of a procedure for executing a printing method according to the first embodiment of the present disclosure.

FIG. 11 is a flowchart of a procedure for executing the printing method according to an embodiment of the present disclosure.

In step S1, the mode input unit 301 of the user terminal 30 displays the mode setting screen on the display 506. The mode setting screen is a screen that enables the operator to set the operation mode of the printing device 10.

Figure 12:
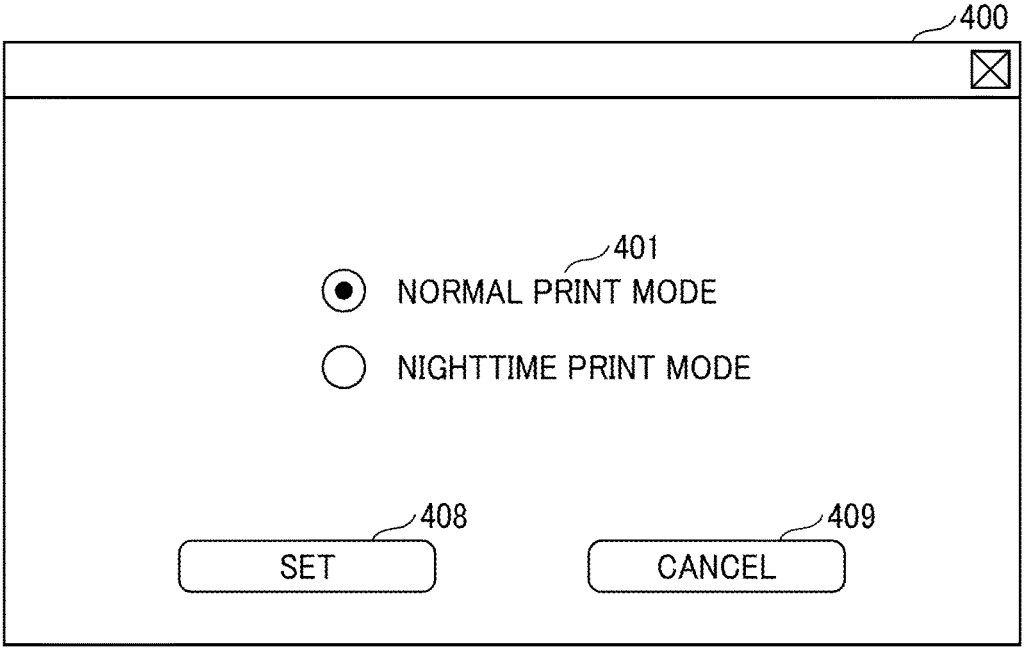
FIG. 12 is a diagram illustrating a mode setting screen according to an embodiment of the present disclosure.

FIG. 12 is a diagram illustrating a mode setting screen 400 according to an embodiment of the present disclosure.

As illustrated in FIG. 12, the mode setting screen 400 according to the present embodiment includes a mode selection field 401, a setting button 408, and a cancel button 409.

In the mode selection field 401, a list of settable operation modes is selectively displayed.

In FIG. 12, the normal print mode and the nighttime print mode are displayed together with radio buttons that allow the operator to select one of the normal print mode and the nighttime print mode. However, the mode selection field 401 may be displayed in any manner as long as any one of the operation modes can be exclusively selected.

When the operator presses the setting button 408, the mode input unit 301 receives input of mode information indicating the operation mode selected in the mode selection field 401. The mode input unit 301 transmits the received mode information to the print server 20. The mode information includes information indicating the operation mode selected in the mode selection field 401.

When the operator presses the cancel button 409, the mode information is not received and the mode setting screen 400 is closed. In the following description of the present embodiment, the setting button 408 is to be pressed.

Referring again to FIG. 11, a further description is given below. In step S2, the mode reception unit 202 of the print server 20 receives the mode information from the user terminal 30. Subsequently, the mode reception unit 202 receives the received mode information. Subsequently, the mode reception unit 202 sets the operation mode of the printing device 10 to the operation mode indicated by the received mode information. The operation mode of the printing device 10 is stored in a storage device such as the HD 504.

The method of setting the operation mode of the printing device 10 according to the operation of the operator's has been described, but the method of setting the operation mode is not limited thereto. For example, the operation mode may be automatically set in conjunction with the working hours of the printing factory 9 such that the normal print mode is set from the start time to the finish time and the nighttime print mode is set from the finish time to the start time of the next business day.

In step S3, the print instruction unit 302 of the user terminal 30 displays a job selection screen on the display 506. The job selection screen is a screen that enables the operator to select a print job to be executed.

Figure 13:
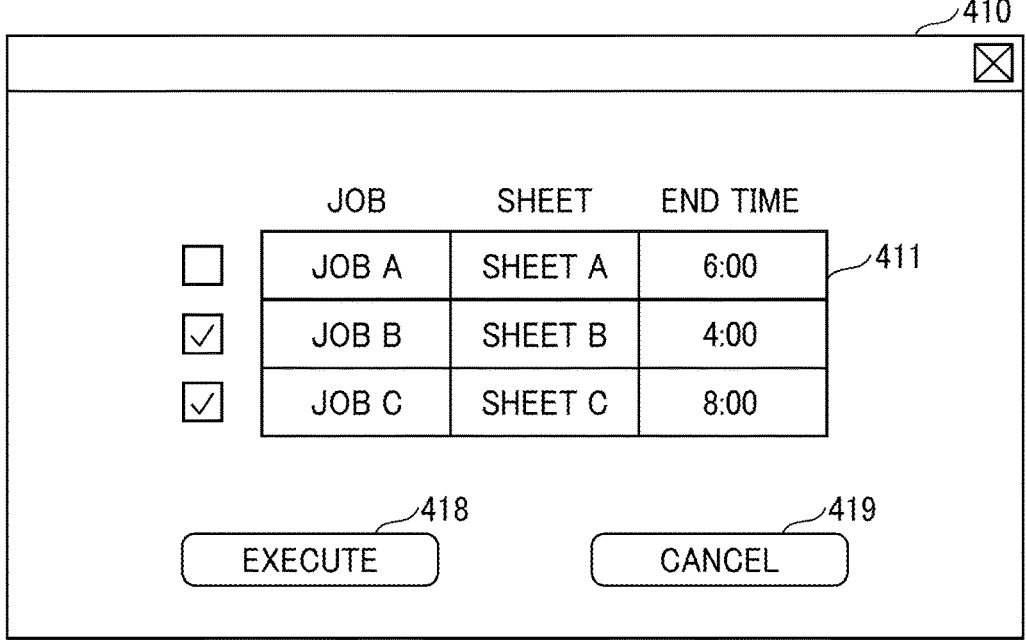
FIG. 13 is a diagram illustrating a job selection screen according to an embodiment of the present disclosure.

FIG. 13 is a diagram illustrating a job selection screen 410 according to an embodiment of the present disclosure.

As illustrated in FIG. 13, the job selection screen 410 according to the present embodiment includes a job selection field 411, an execution button 418, and a cancel button 419.

In the job selection field 411, a list of executable print jobs is selectively displayed.

In FIG. 13, information of the print jobs stored in the job management table is displayed together with selectable check boxes. The display mode of the job selection field 411 is not limited to the manner described above, and any mode may be used as long as each print job can be individually selected. The job selection field 411 may be displayed in such a manner that any one print job can be exclusively selected.

When the operator presses the execution button 418, the print instruction unit 302 receives an instruction to execute the print job selected in the job selection field 411. The print instruction unit 302 transmits the received execution instruction to the print server 20. The execution instruction includes the job code of the print job selected in the job selection field 411. When multiple print jobs are selected in the job selection field 411, the execution instruction includes multiple job codes.

When the operator presses the cancel button 419, the instruction to execute the print job is not received and the job selection screen 410 is closed. In the following description of the present embodiment, the execution button 418 is to be pressed.

Referring again to FIG. 11, a further description is given below. In step S4, the instruction reception unit 203 of the print server 20 receives the instruction to execute the print job from the user terminal 30. Subsequently, the instruction reception unit 203 transmits the received instruction to execute the print job to the environment determination unit 205.

In step S5, the print server 20 determines the current operation mode stored in the storage device. When the operation mode is the normal print mode, the print server 20 proceeds to step S6. When the operation mode is the nighttime print mode, the print server 20 proceeds to step S7.

In step S6, the print server 20 executes the normal printing process. The normal printing process is a process executed when the normal print mode is set.

Figure 14:
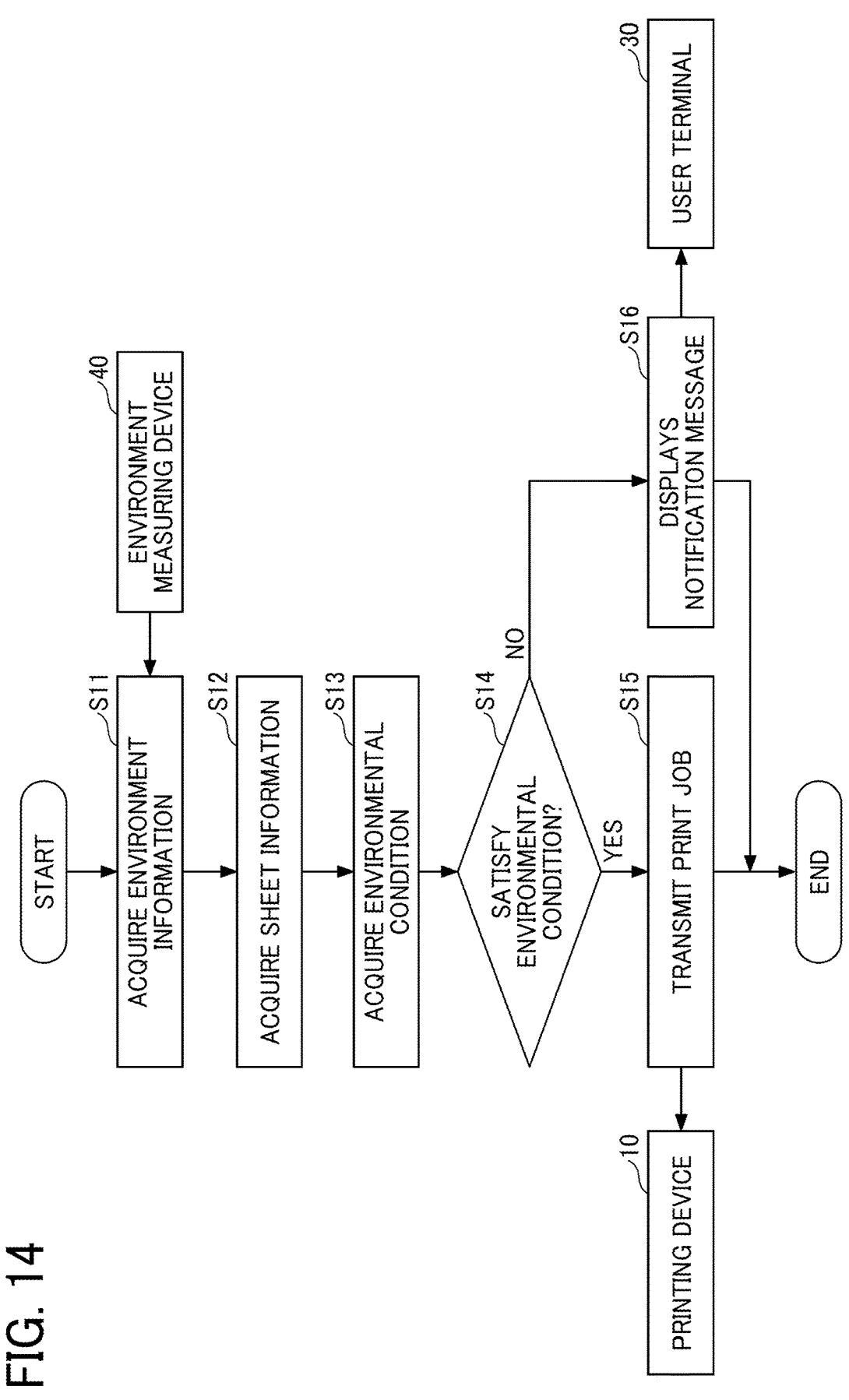
FIG. 14 is a flowchart of a normal printing process according to the first embodiment of the present disclosure.
Figure 15:
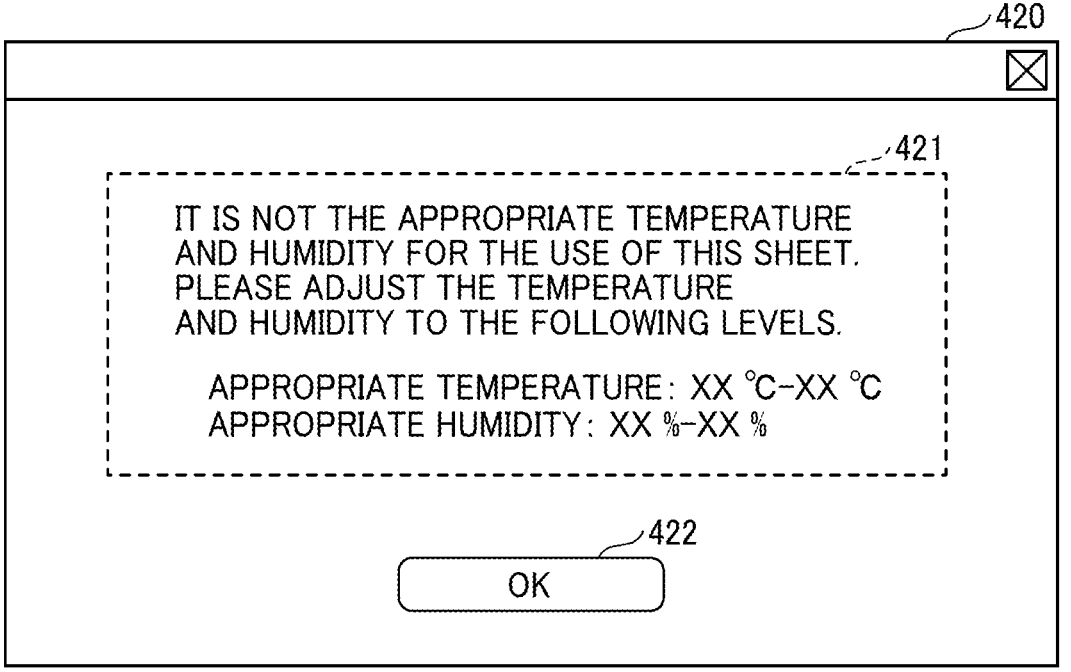
FIG. 15 is a diagram illustrating a notification screen according to an embodiment of the present disclosure.

Referring to FIGS. 14 and 15, a description is given below of the normal printing process according to the present embodiment.

FIG. 14 is a flowchart of a normal printing process (step S6 in FIG. 11) according to the present embodiment.

In step S11, the environment acquisition unit 204 of the print server 20 acquires the ambient temperature and ambient humidity around the printing device 10 from the environment measuring device 40. Subsequently, the environment acquisition unit 204 transmits environmental information including the acquired ambient temperature and ambient humidity to the environment determination unit 205.

In step S12, the environment determination unit 205 of the print server 20 receives the instruction to execute the print job from the instruction reception unit 203. Subsequently, the environment determination unit 205 reads the print job designated by the received execution instruction from the job management table stored in the job storage unit 201. Subsequently, the environment determination unit 205 acquires the sheet information included in the read print job.

In step S13, the environment determination unit 205 of the print server 20 reads the environmental condition information related to the sheet information acquired in step 12 from the environmental condition table stored in the environmental condition storage unit 200. Accordingly, the environment determination unit 205 acquires the environmental condition of the printing sheet designated by the print job.

In step S14, the environment determination unit 205 of the print server 20 receives the environmental information from the environment acquisition unit 204. Subsequently, the environment determination unit 205 determines whether the received environmental information satisfies the environmental condition acquired in step S13. Subsequently, the environment determination unit 205 transmits the result of determination to the operation control unit 206.

Specifically, the environment determination unit 205 determines that the environmental information satisfies the environmental condition when the ambient temperature included in the environmental information is within the appropriate temperature range included in the environmental condition and the ambient humidity included in the environmental information is within the appropriate humidity range included in the environmental condition. On the other hand, the environment determination unit 205 determines that the environmental information does not satisfy the environmental condition when the ambient temperature included in the environmental information is not within the appropriate temperature range included in the environmental condition or the ambient humidity included in the environmental information is not within the appropriate humidity range included in the environmental condition.

The operation control unit 206 receives the result of determination from the environment determination unit 205. Subsequently, when the received result of determination indicates that the environmental condition is satisfied (YES in step S14), the operation control unit 206 proceeds to step S15. On the other hand, when the received result of determination indicates that the environmental condition is not satisfied (NO in step S14), the operation control unit 206 proceeds to step S16.

In step S15, the print control unit 207 of the print server 20 transmits the print job to the printing device 10 in accordance with the execution instruction received in step S4. The printing device 10 receives the print job from the print server 20 and starts printing in accordance with the print job.

In step S16, the notification output unit 208 of the print server 20 transmits a notification message indicating that the environment is desired to be adjusted to the user terminal 30. In the user terminal 30, the notification display unit 303 receives the notification message from the print server 20. The user terminal 30 displays a notification screen indicating the received notification message on the display 506.

FIG. 15 is a diagram illustrating the notification screen according to an embodiment of the present disclosure.

As illustrated in FIG. 15, a notification screen 420 according to the present embodiment includes a notification message 421 indicating that the environment is desired to be adjusted and an OK button 422. The notification message 421 includes a content notifying that the temperature and humidity are not appropriate for the printing sheet and a content suggesting that the temperature and humidity are adjusted to be appropriate.

Referring again to FIG. 11, a further description is given below. In step S7, the print server 20 executes the nighttime printing process. The nighttime printing process is a process executed when the nighttime print mode is set.

Figure 16:
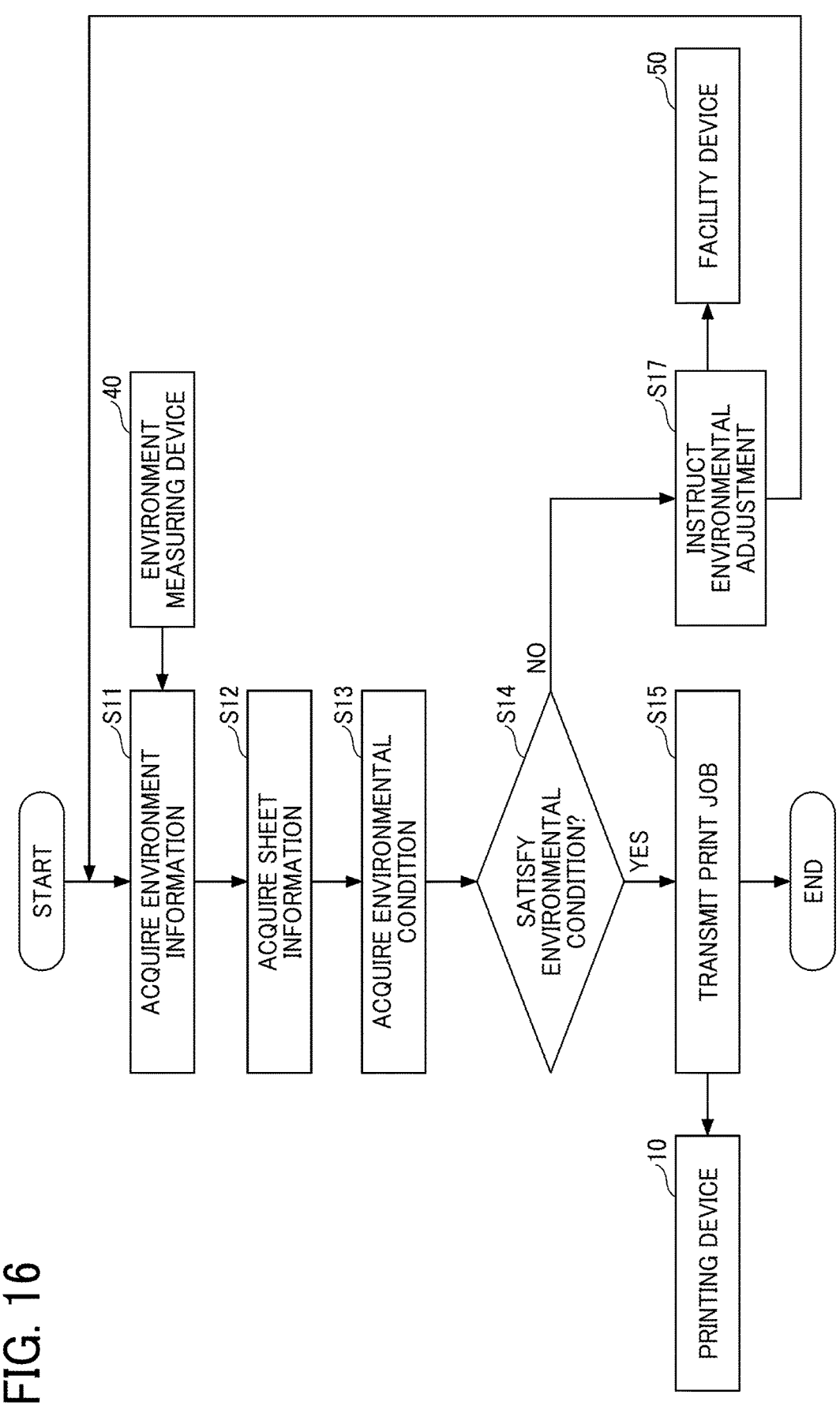
FIG. 16 is a flowchart of a nighttime printing process according to the first embodiment of the present disclosure.

FIG. 16 is a flowchart of a nighttime printing process (step S7 in FIG. 11) according to the present embodiment.

The processing from step S11 to step S15 is the same as the normal printing process. Accordingly, descriptions of these processing are omitted.

In step S17, when the facility device 50 is a device such as the adjustment instruction unit 209 that can be controlled in accordance with a signal instructed from the outside, the adjustment instruction unit 209 of the print server 20 transmits a signal instructing adjustment of the environment to the facility device 50. The signal instructing the adjustment of the environment may include an instruction to turn on and off the facility device 50 (e.g., a control instruction in 0 or 1 is transmitted to the internet protocol (IP) address of the facility device 50) and information indicating the appropriate temperature range and the appropriate humidity range according to the printing sheet.

The facility device 50 receives the signal instructing the adjustment of the environment from the print server 20. When the facility device 50 is an air conditioner, the facility device 50 starts an operation of a cooling function or a heating function with the range of the appropriate temperature included in the received signal as a target temperature. When the facility device 50 is a device including a humidifying function, the facility device 50 starts an operation of the humidifying function with the range of the appropriate humidity included in the received signal as a target humidity.

After transmitting the signal instructing the adjustment of the environment, the adjustment instruction unit 209 returns the processing to step S11. After that, the print server 20 executes the processing from step S11 to step S17 again. When the print server 20 executes step S14 for the second or subsequent time, and the usable temperature range and the usable humidity range included in the environmental condition are satisfied, the print server 20 may determine that the environmental information satisfies the environmental condition.

With the configuration described above, the start of the print job can be stopped until the surrounding environment of the printing device 10 satisfies the environmental condition of a print medium. In other words, the printing device 10 can start printing when the surrounding environment is an environment suitable for the print medium. As a result, even when printing is executed in a case where the surrounding environment of the printing device 10 is suitable for the print medium, or even when the surrounding environment of the printing device 10 changes, the possibility of occurrence of a problem such as a sheet jam can be reduced.

The print server 20 according to the present embodiment transmits a print job to the printing device 10 when the surrounding environment of the printing device 10 satisfies the environmental condition of the printing sheet. Since the print server 20 according to the present embodiment transmits a print instruction when the surrounding environment of the printing device 10 is suitable for printing, a problem such as a sheet jam is unlikely to occur in the printing device 10. As a result, the print server 20 according to the present embodiment can control the operation of the printing device 10 based on whether the surrounding environment of the printing device 10 satisfies the environmental condition of the printing sheet in order to execute printing more efficiently for an operator of the printing factory, who desires to finish even a large amount of printing over a long period of time.

The print server 20 according to the present embodiment acquires information about temperature or humidity as the surrounding environment, and includes a temperature range and a humidity range suitable for use of the printing sheet as the environmental condition. When the ambient temperature or ambient humidity of the printing device 10 is a temperature or humidity suitable for the use of the printing sheet, problems such as sheet jam is unlikely to occur. As a result, the print server 20 according to the present embodiment can control the operation of the printing device 10 in accordance with ambient temperature or ambient humidity of the printing device 10 in order to execute printing more efficiently for an operator of the printing factory, who desires to finish even a large amount of printing over a long period of time.

The print server 20 according to the present embodiment receives the input of the operation mode of the printing device 10 and determines the operation to be performed when the surrounding environment of the printing device 10 does not satisfy the environmental condition of the printing sheet in accordance with the operation mode. The operation performed when the surrounding environment does not satisfy the environmental condition includes outputting a notification indicating that the environment is desired to be adjusted and outputting a signal instructing the external device to adjust the environment. As a result, when the surrounding environment of the printing device 10 does not satisfy the environmental condition of the printing sheet, the print server 20 according to the present embodiment can appropriately operate in accordance with the operation mode of the printing device 10. Thus, the print server 20 according to the present embodiment can control the operation of the printing device 10 more efficiently.

Second Embodiment

In the first embodiment, when the operation mode is the nighttime print mode, printing is started in a case where the surrounding environment of the printing device 10 satisfies the environmental condition of the printing sheet. In a second embodiment, when the operation mode is the nighttime print mode, printing is started such that a print job can be finished by a desired end time even if the surrounding environment of the printing device 10 does not satisfy the environmental condition of the printing sheet.

Although the nighttime print mode is set in a time zone in which the operator is not present, the operator has to manually input an instruction to execute the print job. At this time, the operator can adjust the amount of recording material such as a printing sheet and toner, and the ambient temperature and ambient humidity of the printing device 10. Accordingly, the possibility that the surrounding environment of the printing device 10 changes to an unsuitable environment for printing sheet and a problem such as a sheet jam occurs is low. The possibility depends on the heat insulating property and airtightness of the printing area 90 or the performance of the air conditioning facility 903. However, the possibility is, for example, less than 5%.

On the other hand, when the printing is not performed until the next business day while the surrounding environment of the printing device 10 does not satisfy the environmental condition of the printing sheet, the printing has to be manually started after the start time of the next business day. Since it is assumed that the print job performed in the nighttime print mode takes several hours, the productivity of the overall printing factory 9 is reduced.

In the present embodiment, when an end time is set in the print job, a start time at which the printing has to be started in order to finish the print job by the end time is calculated. Even if the surrounding environment of the printing device 10 does not satisfy the environmental condition of the printing sheet, the printing device 10 is controlled to start the printing when the start time of the print job has passed.

Figure 17:
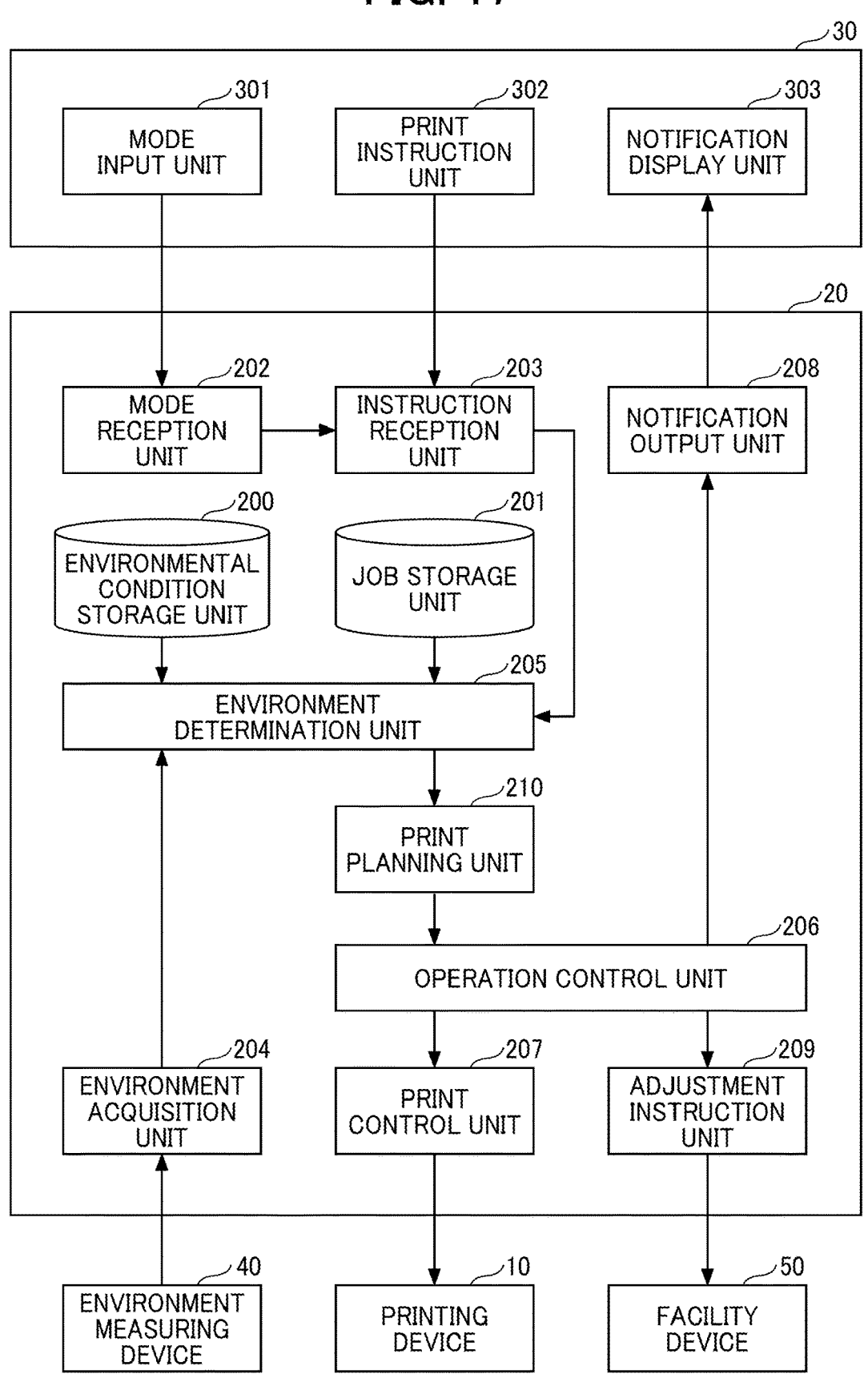
FIG. 17 is a block diagram illustrating a functional configuration of the printing system according to a second embodiment of the present disclosure.

FIG. 17 is a block diagram illustrating a functional configuration of the printing system according to the present embodiment of the present disclosure.

As illustrated in FIG. 17, the print server 20 according to the present embodiment includes an environmental condition storage unit 200, a job storage unit 201, a mode reception unit 202, an instruction reception unit 203, an environment acquisition unit 204, an environment determination unit 205, an operation control unit 206, a print control unit 207, a notification output unit 208, an adjustment instruction unit 209, and a print planning unit 210. In other words, the print server 20 according to the present embodiment is different from the first embodiment in that the print server 20 according to the present embodiment includes the print planning unit 210.

The print planning unit 210 calculates the start time of the print job for which the end time of the print job is set. The start time is the time at which the printing has to be started in order to finish the print job by the end time. The print planning unit 210 calculates the processing time of the print job based on the size of the print data of the print job and the printing performance of the printing device 10, and calculates back from the end time to obtain the start time.

The processing time of the print job can be calculated by any known method based on the size of the print data and the printing performance of the printing device 10. For example, a method may be used in which the job processing time is roughly estimated at least based on a calculation formula obtained by multiplying the CPU processing time of the print job in the printing apparatus by the amount of data to be processed.

A description is given below of a procedure for executing a printing method according to the present embodiment. The procedure for executing the printing method according to the present embodiment differs from the first embodiment in the nighttime printing process.

Figure 18:
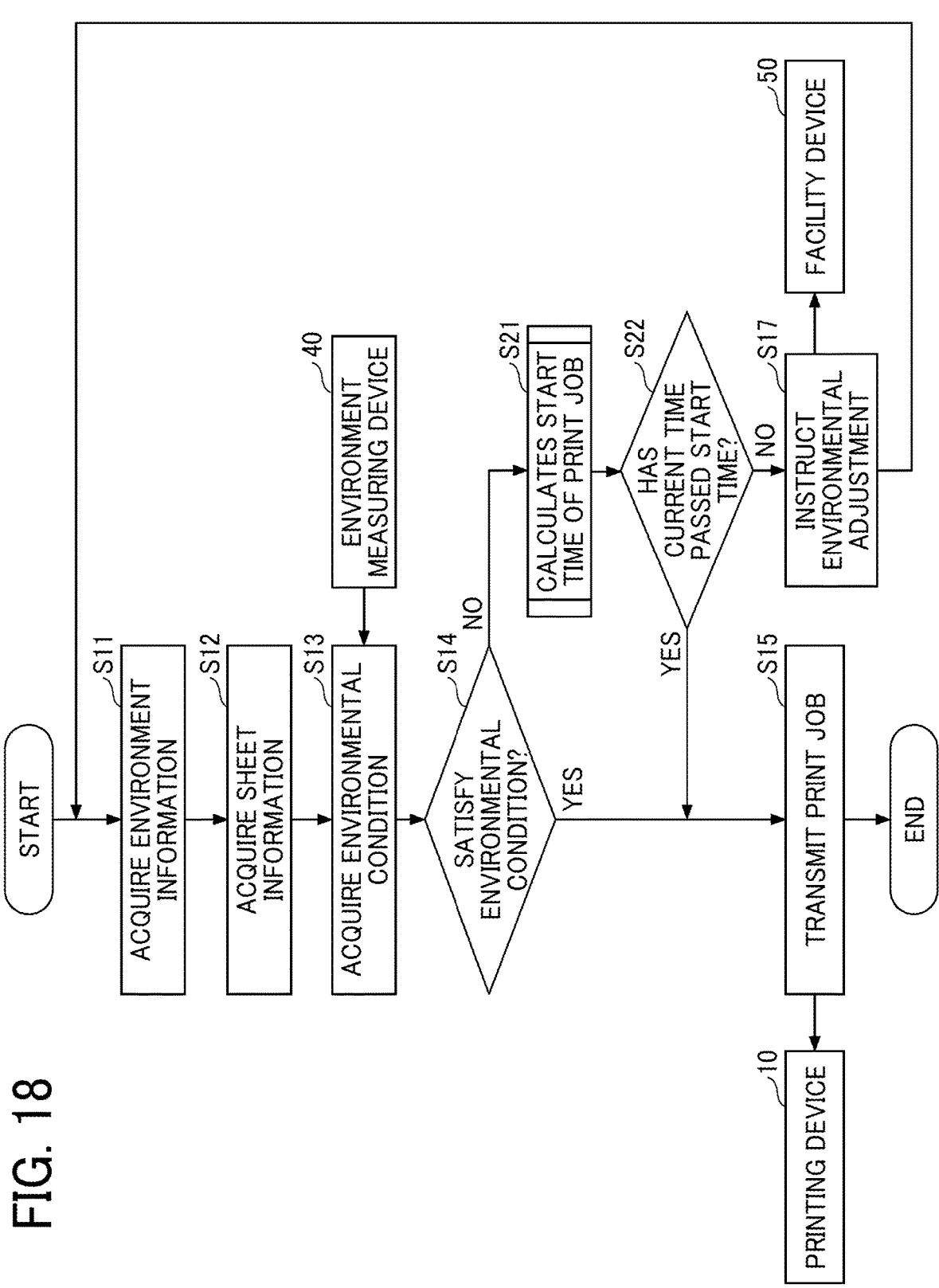
FIG. 18 is a flowchart of a nighttime printing process according to the second embodiment of the present disclosure.
Figure 19:
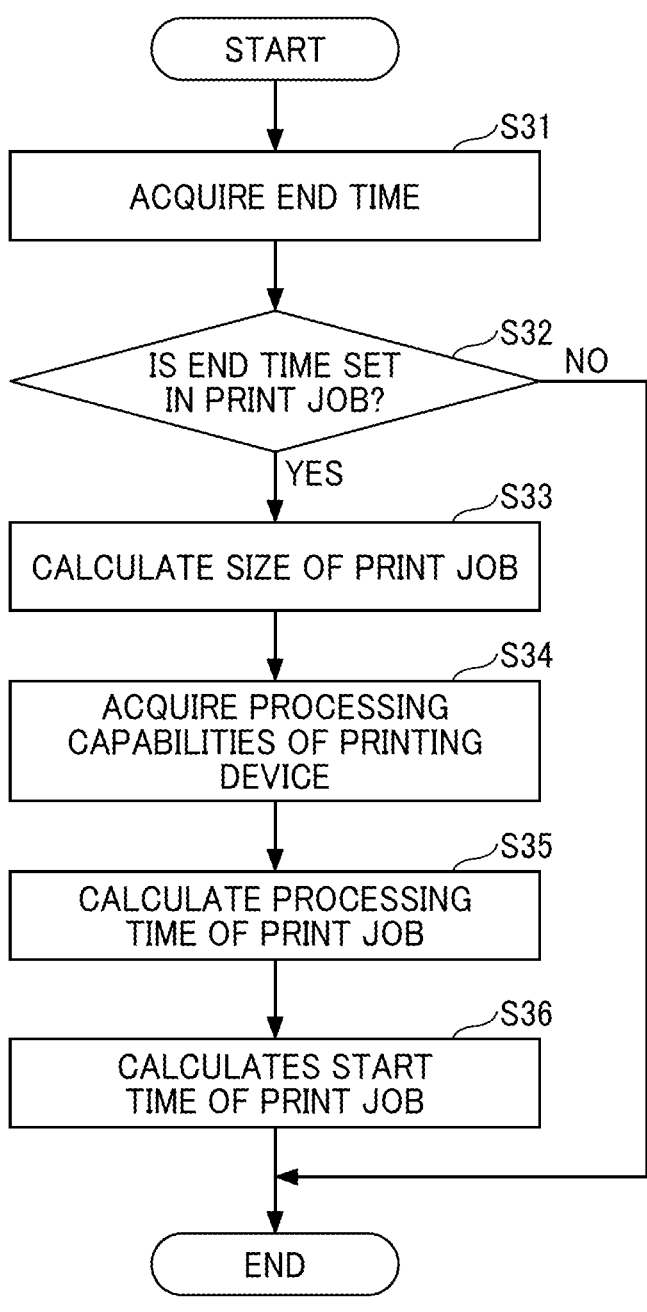
FIG. 19 is a flowchart of a start time calculation process according to the second embodiment of the present disclosure.

Referring to FIGS. 18 and 19, a description is given below of the nighttime printing process according to the present embodiment.

FIG. 18 is a flowchart of the nighttime printing process (step S7 in FIG. 11) according to the present embodiment of the present disclosure.

The processing from step S11 to step S17 is the same as that in the first embodiment except for the branch destination in step S14. Accordingly, descriptions of these processing are omitted.

In step S14, when the result of determination by the environment determination unit 205 indicates that the environmental condition is satisfied (YES in step S14), the operation control unit 206 of the print server 20 proceeds to step S15. On the other hand, when the result of determination by the environment determination unit 205 indicates that the environmental condition is not satisfied (NO in step S14), the operation control unit 206 proceeds to step S21.

In step S21, the print planning unit 210 of the print server 20 determines whether the end time is set in the print job received in step S4. Subsequently, when the end time is set in the print job, the print planning unit 210 calculates the start time of the print job. Subsequently, the print planning unit 210 transmits the calculated start time to the operation control unit 206.

FIG. 19 is a flowchart of a start time calculation process (step S21 in FIG. 18) according to the present embodiment of the present disclosure.

In step S31, the print planning unit 210 requests a print job from the environment determination unit 205. The environment determination unit 205 transmits the print job to the print planning unit 210 in response to the request from the print planning unit 210. The print planning unit 210 acquires the end time included in the print job received from the environment determination unit 205.

In step S32, the print planning unit 210 determines whether the end time is set in the print job. When the end time is set (YES in step S32), the print planning unit 210 proceeds to step S33. When the end time is not set (NO in step S32), the print planning unit 210 ends the start time calculation process.

In step S33, the print planning unit 210 acquires print data included in the print job received in step S31. Subsequently, the print planning unit 210 calculates the size of the print job based on the print data.

In step S34, the print planning unit 210 acquires the processing performance of the printing device 10.

The processing performance of the printing device 10 may be stored in advance in a storage unit of the print server 20 or may be acquired from the printing device 10 based on a predetermined protocol.

In step S35, the print planning unit 210 calculates the processing time of the print job based on the size of the print job calculated in step S33 and the processing performance of the printing device 10 acquired in step S34. The processing time of the print job is the length of time taking from the start to the finish of the print job.

In step S36, the print planning unit 210 subtracts the processing time of the print job calculated in step S35 from the end time of the print job. Accordingly, the print planning unit 210 can calculate the start time of the print job.

Referring again to FIG. 18, a further description is given below. In step S22, the operation control unit 206 of the print server 20 determines whether the current time has already passed the start time of the print job. When the current time has already passed the start time (YES in step S22), the operation control unit 206 proceeds to step S15. On the other hand, when the current time has not passed the start time (NO in step S22), the operation control unit 206 proceeds to step S17.

In step S15, the print control unit 207 of the print server 20 transmits the print job to the printing device 10 in accordance with the instruction to execute the print job received in step S4. The printing device 10 receives the print job from the print server 20 and starts printing in accordance with the print job.

In step S17, the adjustment instruction unit 209 of the print server 20 transmits a signal instructing adjustment of the environment to the facility device 50. After transmitting the signal instructing the adjustment of the environment, the adjustment instruction unit 209 returns the processing to step S11. After that, the print server 20 executes the processing from step S11 to step S17 again. As a result, even if the surrounding environment of the printing device 10 does not satisfy the environmental condition of the printing sheet, the printing is started so that the print job can be finished by the end time of the print job.

The print server 20 according to the present embodiment calculates the start time for finishing the print job by the designated end time of the print job and transmits the print job to the printing device 10 when the current time has passed the start time. For the printing factory, it is desirable that the printing be finished by the designated end time while utilizing the absence time of the operator, and it is inconvenient and inefficient to spend useless time without starting the printing process. With the print server 20 according to the present embodiment, even if the surrounding environment of the printing device 10 does not satisfy the environmental condition of the printing sheet, it is possible to implement not only the control of not constantly starting the printing but also the execution of more efficient printing process for starting the printing process with priority given to the end time and finishing the print job by the designated end time when the end time (e.g., the work start time of the next business day set after the end of the operator's break time or idle time or before the end of the work time) is designated.

A description is given below of some aspects of the present disclosure.

Aspect 1

An information processing apparatus includes an instruction reception unit, an environment acquisition unit, an environmental condition acquisition unit, and a print control unit. The instruction reception unit is configured to receive an execution instruction of a print job in which a print medium is designated or detected. The environment acquisition unit is configured to acquire environmental information indicating a surrounding environment of a printing device. The environmental condition acquisition unit is configured to acquire environmental condition information indicating an environmental condition in accordance with the print medium. The print control unit is configured to transmit the print job to the printing device when the environmental information satisfies the environmental condition.

Aspect 2

In the information processing apparatus according to Aspect 1, the environmental condition acquisition unit acquires the environmental condition information related to the designated or detected print medium from a storage unit that stores the environmental condition information related to multiple print media.

Aspect 3

In the information processing apparatus according to Aspect 1 or Aspect 2, the environmental information includes information related to at least one of temperature and humidity. The environmental condition includes at least one of a temperature range and a humidity range suitable for use of the print medium.

Aspect 4

The information processing apparatus according to Aspect 3 further includes a mode reception unit and an operation control unit. The mode reception unit is configured to receive an input of mode information indicating an operation mode of the printing device. The operation control unit is configured to determine an operation when the environmental information does not satisfy the environmental condition based on the mode information.

Aspect 5

The information processing apparatus according to any one of Aspects 1 to 4 further includes a notification output unit. The notification output unit is configured to output a notification indicating that the environment is desired to be adjusted when the environmental information does not satisfy the environmental condition.

Aspect 6

The information processing apparatus according to any one of Aspects 1 to 4 further includes an adjustment instruction unit. The adjustment instruction unit is configured to output a signal for instructing an external device to adjust the environment when the environmental information does not satisfy the environmental condition.

Aspect 7

In the information processing apparatus according to Aspect 6, the external device includes at least one of a facility device having an air conditioning function and a facility device having a humidifying function.

Aspect 8

The information processing apparatus according to any one of Aspects 1 to 4 further includes a print planning unit. The print planning unit is configured to calculate a start time for finishing the print job at an end time designated by the print job. When the environmental information does not satisfy the environmental condition and the current time has passed the start time, the print control unit transmits the print job to the printing device.

Aspect 9

A printing system is a system in which a printing device, an information processing terminal, and an information processing apparatus are communicable via a network. The information processing terminal includes a print instruction unit. The print instruction unit is configured to transmit an execution instruction of a print job in which a print medium is designated or detected to the information processing apparatus. The information processing apparatus includes an instruction reception unit, an environment acquisition unit, an environmental condition acquisition unit, and a print control unit. The instruction reception unit is configured to receive the execution instruction from the information processing terminal. The environment acquisition unit is configured to acquire environmental information indicating a surrounding environment of the printing device. The environmental condition acquisition unit is configured to acquire environmental condition information indicating an environmental condition in accordance with to the print medium. The print control unit is configured to transmit the print job to the printing device when the environmental information satisfies the environmental condition.

Aspect 10

A printing method is performed by a computer. The printing method includes: receiving an execution instruction of a print job in which a print medium is designated or detected; acquiring environmental information indicating a surrounding environment of a printing device; acquiring environmental condition information indicating an environmental condition in accordance with the print medium; and transmitting the print job to the printing device when the environmental information satisfies an environmental condition.

Aspect 11

In the printing method according to Aspect 10, the step of acquiring the environmental condition information includes acquiring the environmental condition information related to the designated or detected print medium from a storage unit that stores the environmental condition information related to multiple print media.

Aspect 12

In the printing method according to Aspect 10 or Aspect 11, the environmental information includes information related to at least one of temperature and humidity. The environmental condition includes at least one of a temperature range and a humidity range suitable for use of the print medium.

Aspect 13

The printing method according to Aspect 12 further includes: receiving an input of mode information indicating an operation mode of the printing device; and determining an operation when the environmental information does not satisfy the environmental condition based on the mode information.

Aspect 14

The printing method according to any one of Aspects 10 to 13 further includes outputting a notification indicating that the environment is desired to be adjusted when the environmental information does not satisfy the environmental condition.

Aspect 15

The printing method according to any one of Aspects 10 to 13 further includes outputting a signal for instructing an external device to adjust the environment when the environmental information does not satisfy the environmental condition.

Aspect 16

In the printing method according to Aspect 15, the external device includes at least one of a facility device having an air conditioning function and a facility device having a humidifying function.

Aspect 17

The printing method according to any one of Aspects 10 to 13 further includes: calculating a start time for finishing the print job at an end time designated by the print job; and transmitting the print job to the printing device when the environmental information does not satisfy the environmental condition and the current time has passed the start time.

Aspect 18

A program is performed by a computer. The program causes the computer to execute a process. The process includes: receiving an execution instruction of a print job in which a print medium is designated or detected; acquiring environmental information indicating a surrounding environment of a printing device; acquiring environmental condition information indicating an environmental condition in accordance with the print medium; and transmitting the print job to the printing device when the environmental information satisfies the environmental condition.

The group of apparatuses or devices according to the above-described embodiments are merely one example of multiple computing environments that implement the embodiments disclosed herein. In some embodiments, the print server 20 includes multiple computing devices such as server clusters. Such multiple computing devices are configured to communicate with one another via any type of communication link such as a network or shared memory to implement the processing described in the embodiments of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus which is connected to a printing device through a network comprising:
  a processor configured to:
  receive an execution instruction for executing a print job including sheet information indicating a type of a printing sheet to be used;
  acquire environmental information indicating a surrounding environment of a space where the printing device is installed;
  acquire environmental condition information indicating environmental information suitable for printing for the type of the printing sheet;

determine whether the environmental information satisfies the environmental condition information suitable for printing for the type of the printing sheet, and
  transmit the print job to the printing device only when the environmental information satisfies the environmental condition information,
  wherein the processor is configured to output a signal for instructing an external device to adjust the environment based on the environmental information not satisfying the environmental condition, said external device including a device that is configured to have functions different from the printing device,
  wherein the environmental information includes information related to humidity, and
  wherein the environmental condition includes a range of the humidity suitable for use of the type of the printing sheet.

2. The information processing apparatus according to claim 1, wherein
  the processor is configured to acquire the environmental condition information related to the printing sheet that is designated or detected from a memory that stores environmental condition information related to a plurality of print media.

3. The information processing apparatus according to claim 1, wherein the processor is configured to:
  receive an input of mode information indicating an operation mode of the printing device, said operation mode indicating methods of the print job; and
  determine an operation indicating that the environmental information does not satisfy the environmental condition based on the mode information.

4. The information processing apparatus according to claim 3, wherein the processor is further configured to output a notification indicating that the surrounding environment is desired to be adjusted based on the environmental information not satisfying the environmental condition.

5. The information processing apparatus according to claim 1, wherein the external device includes at least one of a facility device having an air conditioning function or a facility device having a humidifying function.

6. The information processing apparatus according to claim 3, wherein the processor is configured to
  calculate a start time when the print job is to be started so as to be finished at an end time designated by the print job, and
  transmit the print job to the printing device at the start time, based on the environmental information even if the environmental information does not satisfy the environmental condition.

7. The information processing apparatus according to claim 1, wherein the type of printing sheet includes a material type of the printing sheet.

8. The information processing apparatus according to claim 1, wherein the material type of the printing sheet is one of plain paper, high-quality paper, coated paper, matte paper, leatherette, thick paper or thin paper, or overhead projector (OHP).

9. The information processing apparatus according to claim 1, wherein the processor configured to:
  receive an input of mode information indicating an operation mode of the printing device; and
  determine, based on the mode information, an operation to be performed when the environmental information does not satisfy the environmental condition information.

10. The information processing apparatus according to claim 1, wherein the processor configured to:

calculate for the print job such that the print job is completed by a designated end time, the start time being determined based on an expected time required for the external device to adjust the environment to satisfy the environmental condition information, and transmit the print job to the printing device at the start time, based on the environmental information even if the environmental information does not satisfy the environmental condition.

11. A printing system comprising:

a printing device;

an information processing terminal; and an information processing apparatus communicably connected with the information processing terminal and the printing device through a network, the information processing terminal including first processor configured to transmit an execution instruction for executing a print job in which a printing sheet is designated or detected to the information processing apparatus;

the information processing apparatus including second processor configured to:

receive the execution instruction from the information processing terminal, said execution instruction including sheet information indicating a type of the printing sheet to be used;

acquire environmental information indicating a surrounding environment of a space where the printing device is installed;

acquire environmental condition information indicating environmental information suitable for the type of the printing sheet;

determine whether the environmental information satisfies the environmental condition information suitable for printing for the type of the printing sheet, and transmit the print job to the printing device only when the environmental information satisfies the environmental condition information, wherein the second processor is further configured to output a signal for instructing an external device to adjust the environment based on the environmental information not satisfying the environmental condition, said external device including a device that is configured to have functions different from the printing device, wherein the environmental information includes information related to humidity, and wherein the environmental condition includes a range of the humidity suitable for use of the type of the printing sheet.

12. An information processing method performed by an information processing apparatus including a processor and connected to a printing device through a network, comprising:

receiving, by the processor, an execution instruction for executing a print job in which a printing sheet is designated or detected, said execution instruction including sheet information indicating a type of the printing sheet to be used;

acquiring, by the processor, environmental information indicating a surrounding environment of a space where the printing device is installed;

acquiring, by the processor, environmental condition information indicating environmental information suitable for the type of the printing sheet;

determine whether the environmental information satisfies the environmental condition information suitable for printing for the type of the printing sheet, and transmitting, by the processor, the print job to the printing device only when the environmental information satisfies the environmental condition information, wherein the method further comprises:

outputting a signal for instructing an external device to adjust the environment based on the environmental information not satisfying the environmental condition, said external device including a device that is configured to have functions different from the printing device, wherein the environmental information includes information related to humidity, and wherein the environmental condition includes a range of the humidity suitable for use of the type of the printing sheet.

13. The printing method according to claim 12, wherein the acquiring environmental condition information includes acquiring the environmental condition information related to the printing sheet that is designated or detected from a memory that stores environmental condition information related to a plurality of print media.

14. The information processing method according to claim 12, wherein the environmental information includes information related to at least one of temperature or humidity, and the environmental condition includes a range of the at least one of temperature or humidity suitable for use of the printing sheet.

15. The information processing method according to claim 14, further comprising:

receiving, by the processor, an input of mode information indicating an operation mode of the printing device, said operation mode indicating methods of the print job; and determining, by the processor, an operation when the environmental information does not satisfy the environmental condition based on the mode information.

16. The printing method according to claim 15, further comprising outputting, by the processor, a notification indicating that the surrounding environment is desired to be adjusted when the environmental information does not satisfy the environmental condition.

17. The printing method according to claim 15, further comprising outputting, by the processor, a signal for instructing an external device to adjust the surrounding environment when the environmental information does not satisfy the environmental condition.

18. The printing method according to claim 17, wherein the external device includes at least one of a facility device having an air conditioning function or a facility device having a humidifying function.

19. The printing method according to claim 15, further comprising:

calculating, by the processor, a start time for finishing the print job at an end time designated by the print job; and transmitting, by the processor, the print job to the printing device when the environmental information does not satisfy the environmental condition and current time has passed the start time.

20. A non-transitory, computer-readable storage medium storing computer-readable program code that causes a computer, to perform the printing method of claim 12.

* * * * *